United States Patent
Marczuk et al.

(10) Patent No.: US 11,548,531 B2
(45) Date of Patent: Jan. 10, 2023

(54) AUTONOMOUS VEHICLE FLEET MANAGEMENT FOR REDUCED TRAFFIC CONGESTION

(71) Applicant: Motional AD LLC, Boston, MA (US)

(72) Inventors: Katarzyna Anna Marczuk, Singapore (SG); Marc Lars Ljungdahl Albert, Singapore (SG)

(73) Assignee: Motional AD LLC, Boston, MA (US)

( * ) Notice: Subject to any disclaimer, the term of this patent is extended or adjusted under 35 U.S.C. 154(b) by 111 days.

(21) Appl. No.: 16/885,380

(22) Filed: May 28, 2020

(65) Prior Publication Data

US 2020/0377128 A1   Dec. 3, 2020

Related U.S. Application Data

(60) Provisional application No. 62/853,257, filed on May 28, 2019.

(51) Int. Cl.
*B60W 60/00* (2020.01)
*G08G 1/00* (2006.01)

(52) U.S. Cl.
CPC ....... *B60W 60/00253* (2020.02); *G08G 1/202* (2013.01); *G08G 1/22* (2013.01);
(Continued)

(58) Field of Classification Search
CPC ....... B60W 60/00253; B60W 2552/10; B60W 2554/4041; B60W 2554/60; G08G 1/202; G08G 1/22
See application file for complete search history.

(56) References Cited

U.S. PATENT DOCUMENTS 6,182,125 B1  1/2001  Borella et al.
9,373,149 B2  6/2016  Abhyanker
(Continued)

FOREIGN PATENT DOCUMENTS

CN   107074065   8/2017
CN   107850895   3/2018
(Continued)

OTHER PUBLICATIONS

J.Pan, M. Khan, I Popa et al. "Proactive vehicle re-routing strategies for congestion avoidance" (2012 8th IEEE International Conference on Distributed Computing in Sensor Systems) (Year: 2012).*
(Continued)

*Primary Examiner* — Peter D Nolan
*Assistant Examiner* — Tanya C Sienko
(74) *Attorney, Agent, or Firm* — Fish & Richardson P.C.

(57) ABSTRACT

Techniques are provided for autonomous vehicle fleet management for reduced traffic congestion. A request is received for a vehicular ride. The request includes an initial spatiotemporal location and a destination spatiotemporal location. A processor is used to generate a representation of lane segments. Each lane segment is weighted in accordance with a number of other vehicles on the lane segment. A vehicle located within a threshold distance to the initial spatiotemporal location is identified such that the identified vehicle has at least one vacant seat. The processor is used to determine a route for operating the identified vehicle from the initial spatiotemporal location to the destination spatiotemporal location. The route includes one or more lane segments of the lane segments. An aggregate of weights of the one or more lane segments is below a threshold value. The received request and the determined route are transmitted to the identified vehicle.

21 Claims, 22 Drawing Sheets

(52) U.S. Cl.
CPC . *B60W 2552/10* (2020.02); *B60W 2554/4041* (2020.02); *B60W 2554/60* (2020.02)

(56) References Cited

U.S. PATENT DOCUMENTS

| | | | |
|---|---|---|---|
| 9,494,439 B1 | 11/2016 | Ross et al. | |
| 9,940,840 B1* | 4/2018 | Schubert | G01C 21/3407 |
| 10,495,471 B2 | 12/2019 | Sweeney et al. | |
| 11,181,905 B2* | 11/2021 | Alalao | G05D 1/0088 |
| 2005/0049900 A1* | 3/2005 | Hirose | G07F 17/16 |
| | | | 705/6 |
| 2007/0290839 A1* | 12/2007 | Uyeki | G01C 21/3694 |
| | | | 340/539.13 |
| 2007/0291693 A1 | 12/2007 | Schultz et al. | |
| 2008/0027600 A1 | 1/2008 | Bierdeman et al. | |
| 2008/0095108 A1 | 4/2008 | Malladi et al. | |
| 2008/0114542 A1* | 5/2008 | Nambata | G01C 21/3453 |
| | | | 701/533 |
| 2008/0180237 A1 | 7/2008 | Fayyad et al. | |
| 2008/0201032 A1 | 8/2008 | Fayyad et al. | |
| 2008/0275629 A1* | 11/2008 | Yun | G08G 1/096844 |
| | | | 701/118 |
| 2010/0166065 A1 | 7/2010 | Perlman et al. | |
| 2013/0253810 A1* | 9/2013 | Miyajima | G08G 1/0133 |
| | | | 701/118 |
| 2014/0074402 A1* | 3/2014 | Hassib | G01C 21/3461 |
| | | | 701/533 |
| 2014/0358409 A1 | 12/2014 | Khoe et al. | |
| 2015/0066355 A1* | 3/2015 | Siegel | G01C 21/3492 |
| | | | 701/410 |
| 2015/0161533 A1* | 6/2015 | Kawamoto | G06Q 50/30 |
| | | | 705/7.12 |
| 2015/0210387 A1 | 7/2015 | Ling et al. | |
| 2015/0339928 A1 | 11/2015 | Ramanujam | |
| 2016/0187150 A1* | 6/2016 | Sherman | G06Q 10/06311 |
| | | | 705/7.15 |
| 2016/0209220 A1 | 7/2016 | Laetz et al. | |
| 2016/0358475 A1 | 12/2016 | Prokhorov et al. | |
| 2017/0039667 A1 | 2/2017 | Kim | |
| 2017/0043780 A1 | 2/2017 | Yoon | |
| 2017/0075358 A1* | 3/2017 | Zhang | G05D 1/0297 |
| 2017/0093947 A1 | 3/2017 | Smith | |
| 2017/0098377 A1 | 4/2017 | Marco et al. | |
| 2017/0160092 A1 | 6/2017 | Botea et al. | |
| 2017/0200368 A1 | 7/2017 | Le Vine et al. | |
| 2017/0249794 A1 | 8/2017 | Davis | |
| 2017/0350715 A1* | 12/2017 | Tanizaki | G01C 21/34 |
| 2018/0060827 A1 | 3/2018 | Abbas et al. | |
| 2018/0136651 A1 | 5/2018 | Levinson et al. | |
| 2018/0192142 A1 | 7/2018 | Paul | |
| 2018/0202822 A1 | 7/2018 | Delizio et al. | |
| 2018/0209806 A1 | 7/2018 | Rakah | |
| 2018/0233047 A1 | 8/2018 | Mandeville-Clarke | |
| 2018/0267537 A1 | 9/2018 | Kroop et al. | |
| 2019/0051174 A1 | 2/2019 | Hague et al. | |
| 2020/0041994 A1 | 2/2020 | Alalao | |
| 2020/0042019 A1 | 2/2020 | Marczuk et al. | |
| 2020/0124428 A1* | 4/2020 | Hamilton | G05D 1/0088 |
| 2020/0133306 A1* | 4/2020 | Chadha | G06Q 50/30 |
| 2020/0175633 A1* | 6/2020 | Fujimoto | B60W 60/00253 |
| 2020/0286021 A1* | 9/2020 | Luckay | G06Q 10/06312 |
| 2020/0314089 A1* | 10/2020 | Lasynetskyi | H04L 9/3263 |
| 2022/0075368 A1* | 3/2022 | Alalao | G05D 1/0027 |

FOREIGN PATENT DOCUMENTS

| | | | | |
|---|---|---|---|---|
| CN | 108292474 | | 7/2018 | |
| CN | 108351221 | | 7/2018 | |
| EP | 1959400 | | 8/2008 | |
| KR | 20120132978 A | * | 12/2012 | G08G 1/0969 |
| WO | WO2002071787 | | 9/2002 | |
| WO | WO-2009059572 A1 | * | 5/2009 | G01C 21/3492 |

OTHER PUBLICATIONS

"The Best Mapping Platforms to Avoid Toll Roads" NearPlace published Oct. 18, 2018 https://datantify.com/lab/nearplace/blog/the-best-mapping-platforms-to-avoid-toll-roads/ (Year: 2018).*

Dijkstra's algorithm—Wikipedia page (obtained from Wayback machine) Dec. 31, 2018 (Year: 2018).*

[No Author Listed], "J3016: SAE International Surface Vehicle Recommended Practice, Taxonomy and Definitions for Terms Related to Driving Automation Systems for On-Road Motor Vehicles," SAE International, Sep. 30, 2016, 30 pages.

U.S. Appl. No. 16/530,827, filed Aug. 2, 2019, Marczuk.

U.S. Appl. No. 16/530,837, filed Aug. 2, 2019, Alalao.

* cited by examiner

1900

```
┌─────────────────────────────────────────────────────────────┐
│ Receive, from a user device, a request for a vehicular ride,│
│ wherein the request comprises an initial spatiotemporal     │
│ location and a destination spatiotemporal location          │
│                        1904                                 │
└─────────────────────────────────────────────────────────────┘
                              ↓
┌─────────────────────────────────────────────────────────────┐
│ Generate, using one or more processors, a representation of │
│ a plurality of lane segments, wherein each lane segment in  │
│ the representation is weighted in accordance with a number  │
│ of other vehicles on the lane segment                       │
│                        1908                                 │
└─────────────────────────────────────────────────────────────┘
                              ↓
┌─────────────────────────────────────────────────────────────┐
│ Identify, using the one or more processors, a vehicle       │
│ located within a threshold distance to the initial          │
│ spatiotemporal location, such that the identified vehicle   │
│ comprises at least one vacant seat                          │
│                        1912                                 │
└─────────────────────────────────────────────────────────────┘
                              ↓
┌─────────────────────────────────────────────────────────────┐
│ Determine, using the one or more processors, a route for    │
│ operating the identified vehicle from the initial           │
│ spatiotemporal location to the destination spatiotemporal   │
│ location, wherein the route comprises one or more lane      │
│ segments of the plurality of lane segments, and wherein an  │
│ aggregate of weights of the one or more lane segments is    │
│ below a threshold value                                     │
│                        1916                                 │
└─────────────────────────────────────────────────────────────┘
                              ↓
┌─────────────────────────────────────────────────────────────┐
│ Transmit, to the identified vehicle, the received request   │
│ and the determined route                                    │
│                        1920                                 │
└─────────────────────────────────────────────────────────────┘
```

```
┌─────────────────────────────────────────────────────────────────────┐
│ Receive, using one or more processors of a vehicle, a request for a │
│ vehicular ride from a user device, wherein the request comprises an │
│ initial spatiotemporal location and a destination spatiotemporal    │
│ location                                                             │
│ 2004                                                                 │
└─────────────────────────────────────────────────────────────────────┘
                                  ↓
┌─────────────────────────────────────────────────────────────────────┐
│ Transmit, to a remote server, the request                           │
│ 2008                                                                 │
└─────────────────────────────────────────────────────────────────────┘
                                  ↓
┌─────────────────────────────────────────────────────────────────────┐
│ Receive, from the remote server, a route for operating the vehicle  │
│ from the initial spatiotemporal location to the destination         │
│ spatiotemporal location, wherein the route comprises one or more    │
│ lane segments                                                        │
│ 2012                                                                 │
└─────────────────────────────────────────────────────────────────────┘
                                  ↓
┌─────────────────────────────────────────────────────────────────────┐
│ Generate, using the one or more processors, a trajectory for        │
│ operating the vehicle on a lane segment of the one or more lane     │
│ segments, wherein the generating comprises                          │
│ 2016                                                                 │
│  ┌───────────────────────────────────────────────────────────────┐  │
│  │ Identify, using sensor data received from one or more sensors │  │
│  │ of the vehicle, an object, such that a probability of a       │  │
│  │ collision of the vehicle with the object is greater than a    │  │
│  │ threshold value                                                │  │
│  │ 2020                                                           │  │
│  └───────────────────────────────────────────────────────────────┘  │
│                                  ↓                                   │
│  ┌───────────────────────────────────────────────────────────────┐  │
│  │ Generate, using the one or more processors, one or more       │  │
│  │ motion segments for the vehicle to avoid the collision        │  │
│  │ 2024                                                           │  │
│  └───────────────────────────────────────────────────────────────┘  │
└─────────────────────────────────────────────────────────────────────┘
```

```
┌─────────────────────────────────────────────────────────────────┐
│ Generate, using one or more processors, a representation of a    │
│ plurality of lane segments for operating a plurality of vehicles │
│                            2104                                  │
└─────────────────────────────────────────────────────────────────┘
                              ↓
┌─────────────────────────────────────────────────────────────────┐
│ Receive, from each vehicle of the plurality of vehicles,         │
│ telemetry data specifying at least one parameter for operating   │
│ the vehicle                                                      │
│                            2108                                  │
└─────────────────────────────────────────────────────────────────┘
                              ↓
┌─────────────────────────────────────────────────────────────────┐
│ Identify, for each vehicle of the plurality of vehicles, a       │
│ corresponding portion of the representation, wherein the portion │
│ comprises one or more lane segments of the plurality of lane     │
│ segments for operating the vehicle in accordance with the        │
│ parameter vector received from the vehicle                       │
│                            2112                                  │
└─────────────────────────────────────────────────────────────────┘
                              ↓
┌─────────────────────────────────────────────────────────────────┐
│ Receive, from a user device, a request for a vehicular ride,     │
│ wherein the request specifies an initial spatiotemporal location │
│ and a destination spatiotemporal location                        │
│                            2116                                  │
└─────────────────────────────────────────────────────────────────┘
                              ↓
┌─────────────────────────────────────────────────────────────────┐
│ Identify, using the one or more processors, a vehicle of the     │
│ plurality of vehicles, such that the initial spatiotemporal      │
│ location and the destination spatiotemporal location are both    │
│ located within the portion of the representation corresponding   │
│ to the identified vehicle                                        │
│                            2120                                  │
└─────────────────────────────────────────────────────────────────┘
```

```
┌─────────────────────────────────────────────────────────────────────┐
│ Transmit, to a vehicle, a first route for operating the vehicle,    │
│ wherein the first route includes a plurality of lane segments       │
│                              2204                                    │
└─────────────────────────────────────────────────────────────────────┘
                                  │
                                  ▼
┌─────────────────────────────────────────────────────────────────────┐
│ Receive, using one or more processors; a notification that one or   │
│ more lane segments of the plurality of lane segments is associated  │
│ with an event                                                        │
│                              2208                                    │
└─────────────────────────────────────────────────────────────────────┘
                                  │
                                  ▼
┌─────────────────────────────────────────────────────────────────────┐
│ Transmit, to the vehicle, a request for a spatiotemporal location    │
│ of the vehicle                                                       │
│                              2212                                    │
└─────────────────────────────────────────────────────────────────────┘
                                  │
                                  ▼
┌─────────────────────────────────────────────────────────────────────┐
│ Responsive to receiving, from the vehicle, the spatiotemporal        │
│ location of the vehicle, determine that the vehicle is located on a  │
│ lane segment different from the one or more lane segments            │
│ associated with the event                                            │
│                              2216                                    │
└─────────────────────────────────────────────────────────────────────┘
                                  │
                                  ▼
┌─────────────────────────────────────────────────────────────────────┐
│ Responsive to the determining that the vehicle is located on the     │
│ lane segment different from the one or more lane segments, generate  │
│ a second route for operating the vehicle, wherein the second route   │
│ avoids the one or more lane segments associated with the event       │
│                              2220                                    │
└─────────────────────────────────────────────────────────────────────┘
```

FIG. 22

AUTONOMOUS VEHICLE FLEET MANAGEMENT FOR REDUCED TRAFFIC CONGESTION

CROSS-REFERENCE TO RELATED APPLICATION

This application claims the benefit of U.S. Provisional Application 62/853,257, filed on May 28, 2019, which is incorporated herein by reference in its entirety.

FIELD OF THE INVENTION

This description relates generally to routing of vehicles for reduced traffic congestion.

BACKGROUND

Operation of a vehicle from an initial location to a final destination often requires a user or the vehicle's decision-making system to select a route through a road network from the initial location to a final destination. Selecting a complex route can require many decisions, making traditional algorithms for route selection impractical. Traditional algorithms are sometimes used to select a route across a directed graph from the initial location to a final destination. However, if a large number of other vehicles on the road use such an algorithm, the selected route may become overloaded and travel may slow to a crawl. In addition, the presence of parked vehicles, construction zones, and pedestrians complicate route selection and operation.

SUMMARY

Techniques are provided for autonomous vehicle fleet management for reduced traffic congestion. The techniques include receiving a request for a vehicular ride from a user device. The request includes an initial spatiotemporal location and a destination spatiotemporal location. One or more processors are used to generate a representation of multiple lane segments. Each lane segment in the representation is weighted in accordance with a number of other vehicles on the lane segment. The one or more processors are used to identify a vehicle located within a threshold distance to the initial spatiotemporal location, such that the identified vehicle includes at least one vacant seat. The one or more processors are used to determine a route for operating the identified vehicle from the initial spatiotemporal location to the destination spatiotemporal location. The route includes one or more lane segments of the multiple lane segments. An aggregate of weights of the one or more lane segments is below a threshold value. The received request and the determined route are transmitted to the identified vehicle.

In some embodiments, one or more processors of a vehicle are used to receive a request for a vehicular ride from a user device. The request includes an initial spatiotemporal location and a destination spatiotemporal location. The request is transmitted to a remote server. From the remote server, a route is received for operating the vehicle from the initial spatiotemporal location to the destination spatiotemporal location. The route includes one or more lane segments. The one or more processors are used to generate a trajectory for operating the vehicle on a lane segment of the one or more lane segments. The generating includes identifying an object using sensor data received from one or more sensors of the vehicle. A probability of a collision of the vehicle with the object is greater than a threshold value. The one or more processors are used to generate one or more motion segments for the vehicle to avoid the collision.

In some embodiments, one or more processors are used to generate a representation of multiple lane segments for operating multiple vehicles. From each vehicle of the multiple vehicles, telemetry data is received specifying at least one parameter for operating the vehicle. For each vehicle of the multiple vehicles, a corresponding portion of the representation is identified. The portion includes one or more lane segments of the multiple lane segments for operating the vehicle in accordance with the telemetry data received from the vehicle. From a user device, a request is received for a vehicular ride. The request specifies an initial spatiotemporal location and a destination spatiotemporal location. The one or more processors are used to identify a vehicle of the multiple vehicles, such that the initial spatiotemporal location and the destination spatiotemporal location are both located within the portion of the representation corresponding to the identified vehicle.

In some embodiments, a first route for operating a vehicle is transmitted to the vehicle. The first route includes multiple lane segments. One or more processors are used to receive a notification that one or more lane segments of the multiple lane segments is associated with an event. A request for a spatiotemporal location of the vehicle is transmitted to the vehicle. Responsive to receiving the spatiotemporal location of the vehicle, it is determined that the vehicle is located on a lane segment distinct from the one or more lane segments associated with the event. Responsive to the determining that the vehicle is located on the lane segment distinct from the one or more lane segments, a second route is generated for operating the vehicle. The second route avoids the one or more lane segments associated with the event.

These and other aspects, features, and implementations can be expressed as methods, apparatus, systems, components, program products, means or steps for performing a function, and in other ways.

These and other aspects, features, and implementations will become apparent from the following descriptions, including the claims.

Among others, the benefits and advantages of the embodiments disclosed herein include construction of a traffic congestion-aware graph representation of the operating environment of multiple vehicle. The usefulness of the congestion-aware graph is increased because is a real-time representation. The use of historically stored data increases the accuracy of the graph generation in the absence of a data connection. The embodiments can also be used to identify an available vehicle in which other passengers are riding to form a carpool. Congestion-aware routing is provided for shared autonomous vehicle routing. In this manner, autonomous vehicles can provide a mobility-on-demand service to travelers. The use of weighted traffic aggregates reduces traffic congestion. Using the embodiments disclosed herein, a fleet of autonomous vehicles can be used as traffic sensors to integrate with other third party traffic information services as well as exploit the connectivity and data transmission options of smart cities. The operational design domain of each autonomous vehicle is taken into account to select a vehicle to be dispatched such that the needs of the passenger is met. By the use of third-party traffic information, local congestion minima and maxima are avoided to achieve a globally efficient solution to reduce traffic congestion. In some embodiments, a high-level route is used to generate an efficient trajectory for the vehicles thereby reducing fuel use, distance traveled, and the risk of collision. In addition, the embodiments disclosed herein reduce traffic congestion caused by emergency situations to reduce the strain on local law enforcement and traffic control.

BRIEF DESCRIPTION OF THE DRAWINGS

FIGS. 19-22 illustrate processes for autonomous vehicle fleet management, in accordance with one or more embodiments.

DETAILED DESCRIPTION

Figure 1:
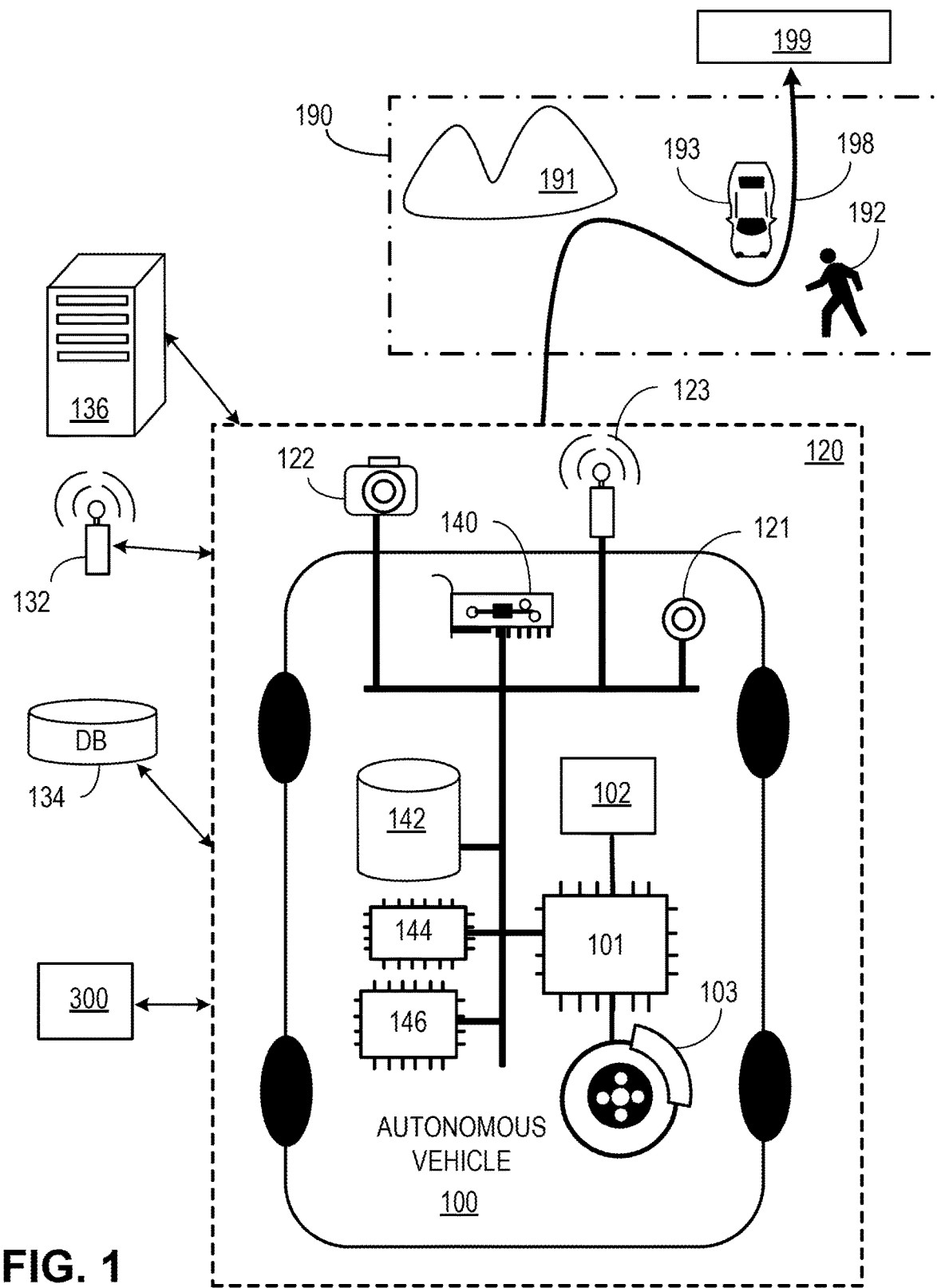
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Operating Environment for AV Fleet Management
8. Examples of AV Fleet Management
9. Processes for AV Fleet Management General Overview A remote server that is used for fleet management of autonomous vehicles (AVs) receives a request for a vehicular ride from a user device. The request can specify a size of the party that will be traveling in an AV, whether a carpool ride is required, an initial spatiotemporal location (starting location), a destination spatiotemporal location (ending location), and travel preferences such as taking or avoiding highways. The remote server includes one or more processors that are used to generate a representation of multiple lane segments. The representation can include a traffic map, a graph, or a data structure such as a linked list. The lane segments are portions of travel lanes of an operating environment of the AV fleet. Each lane segment in the representation is weighted in accordance with a number of other vehicles on the lane segment. Traffic congestion in the operating environment is thus monitored and global AV routing can be performed to reduce congestion. The one or more processors of the remote server are used to identify an AV located within a threshold distance to the initial spatiotemporal location, such that the identified AV includes at least one vacant seat. In the event that a user requests a solo ride, an AV is identified that has all its seats vacant. The one or more processors of the remote server are used to determine a high-level route (e.g., including roads and intersections) for operating the identified AV from the initial spatiotemporal location to the destination spatiotemporal location. The route includes one or more lane segments of the multiple lane segments. The route is identified such that an aggregate of weights of the one or more lane segments is below a threshold value. Thus the traffic congestion is reduced along the determined route. The received request and the determined route are transmitted to the identified AV to pick up the passenger.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computer processors 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
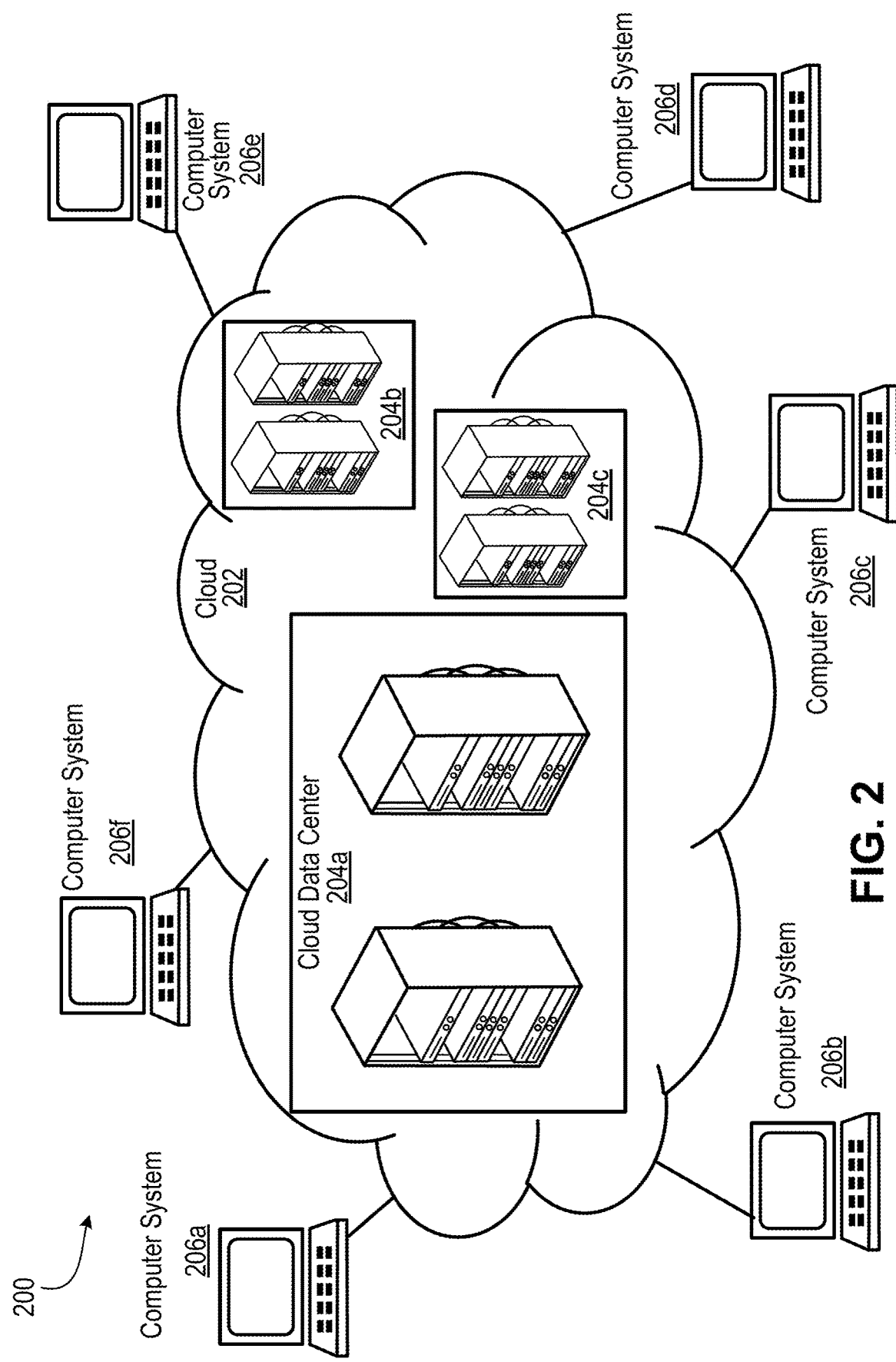
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
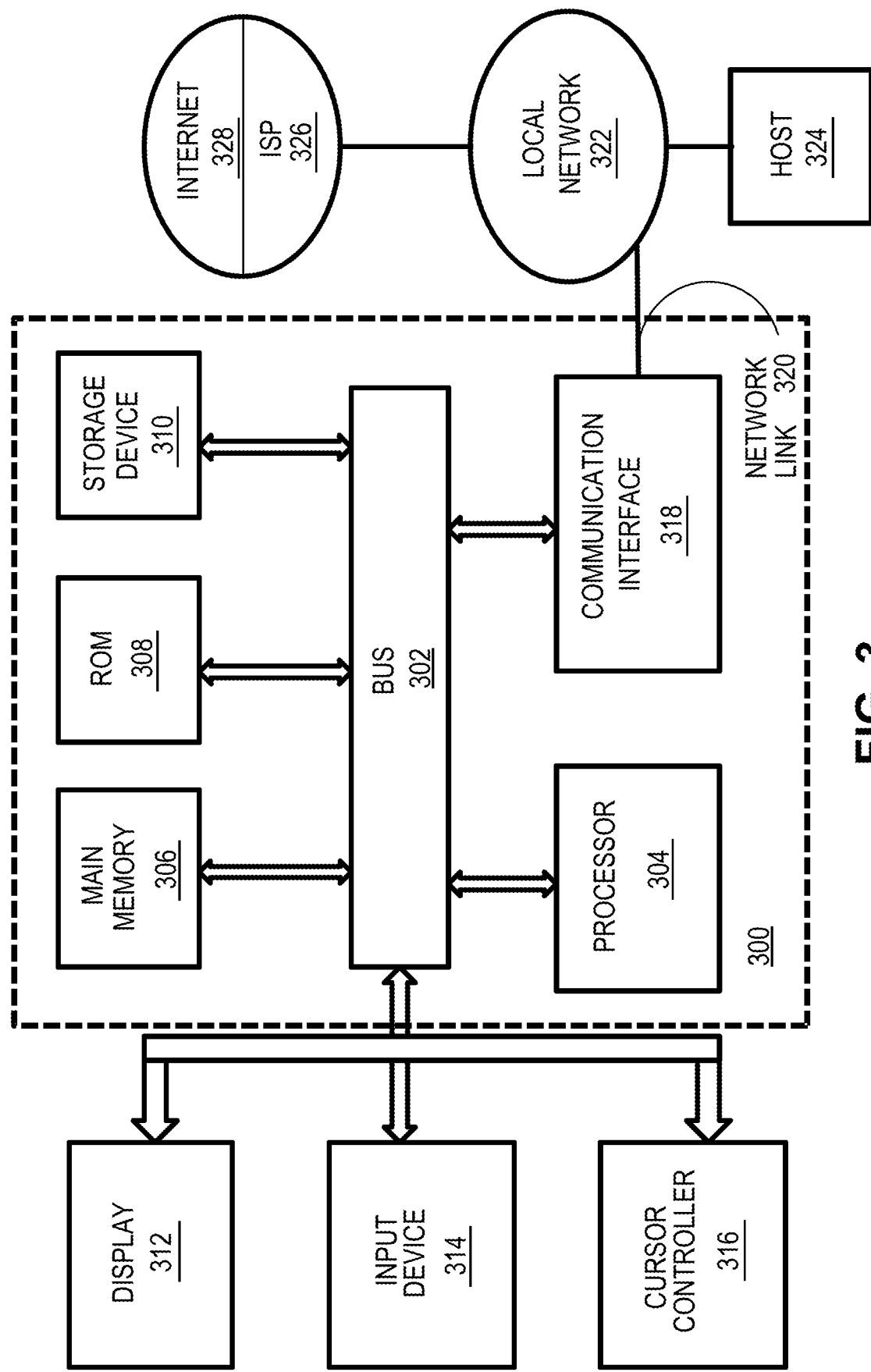
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
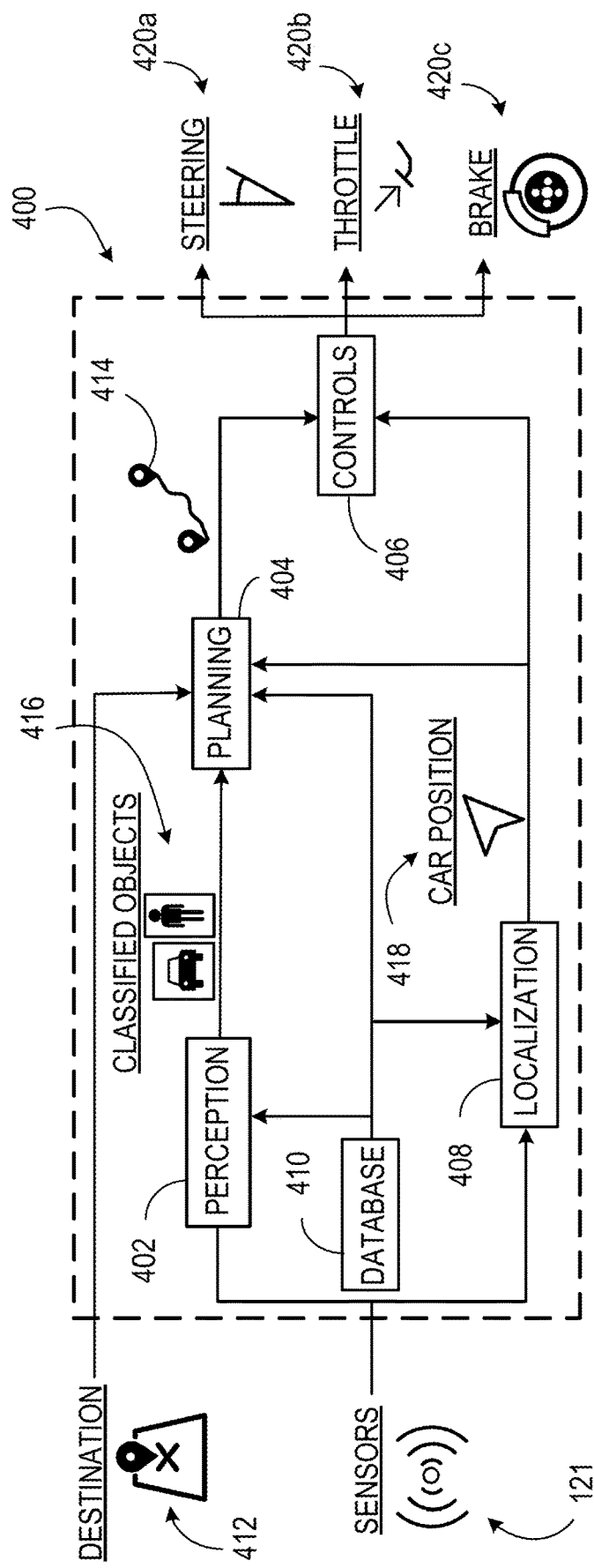
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a*-*c* in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
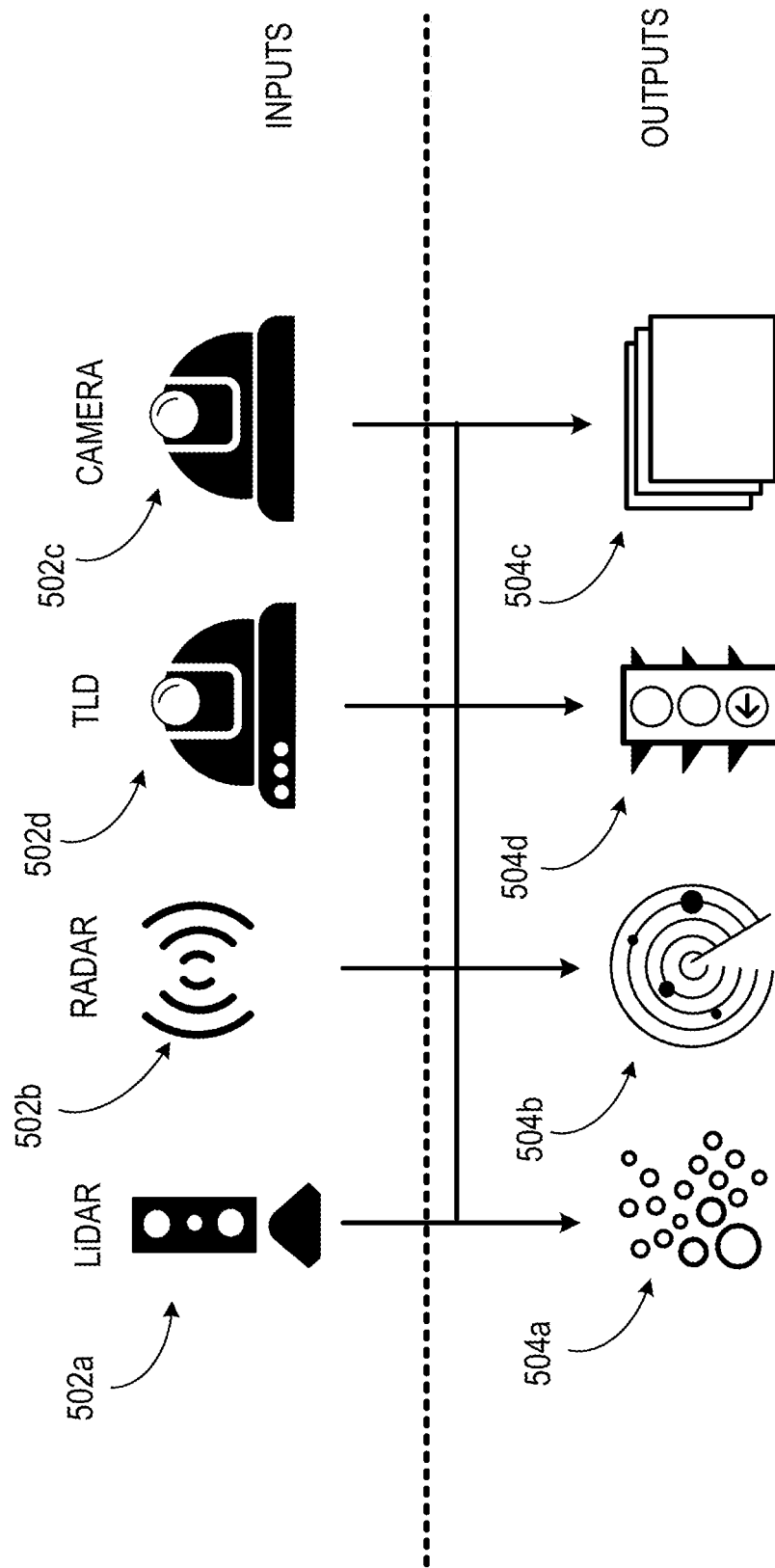
FIG. 5 shows an example of inputs and outputs that may be used by a perception module, in accordance with one or more embodiments.

FIG. 5 shows an example of inputs 502*a*-*d* (e.g., sensors 121 shown in FIG. 1) and outputs 504*a*-*d* (e.g., sensor data) that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual operation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504*a*-*d* are combined using a sensor fusion technique. Thus, either the individual outputs 504*a*-*d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
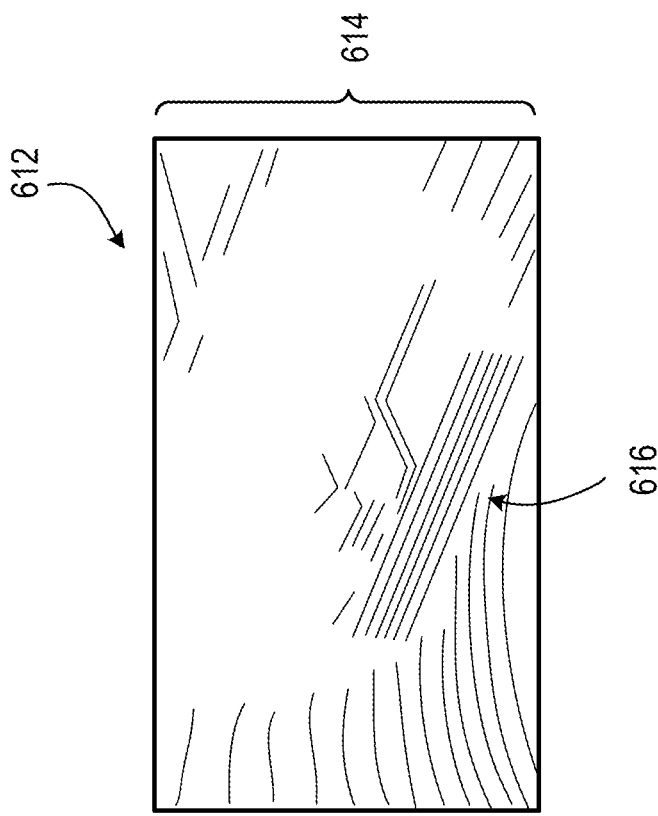
FIG. 6 shows an example of a LiDAR system, in accordance with one or more embodiments.
Figure 6:
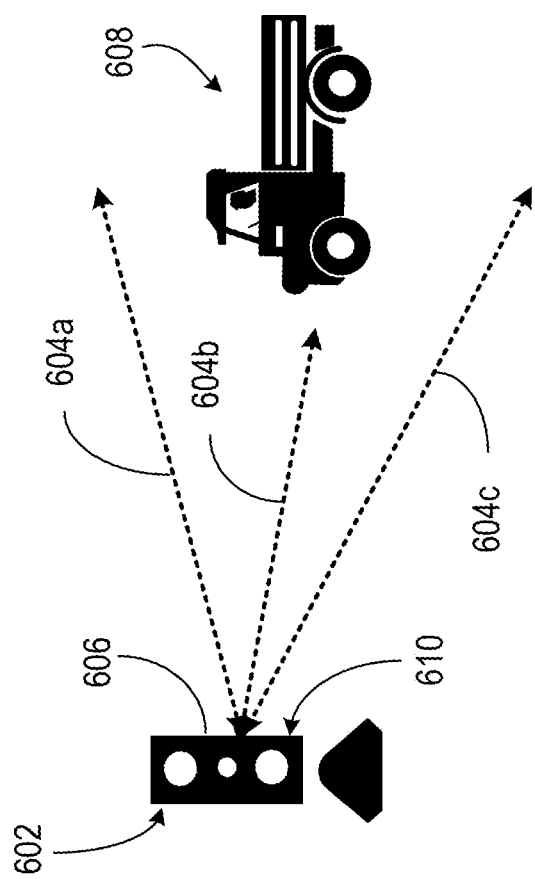

FIG. 6 shows an example of a LiDAR system 602 (e.g., the input 502*a* shown in FIG. 5). The LiDAR system 602 emits light 604*a*-*c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
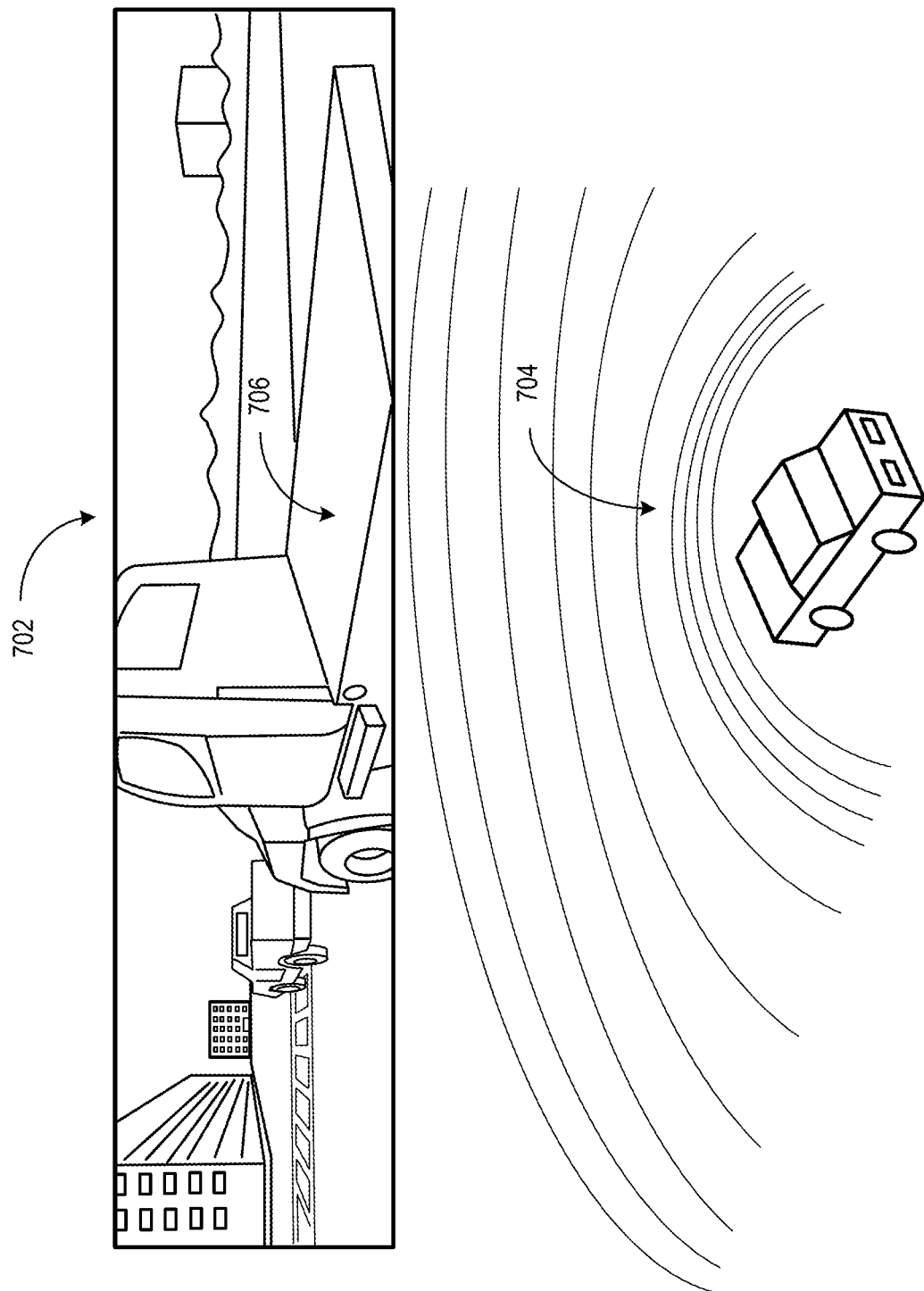
FIG. 7 shows the LiDAR system in operation, in accordance with one or more embodiments.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
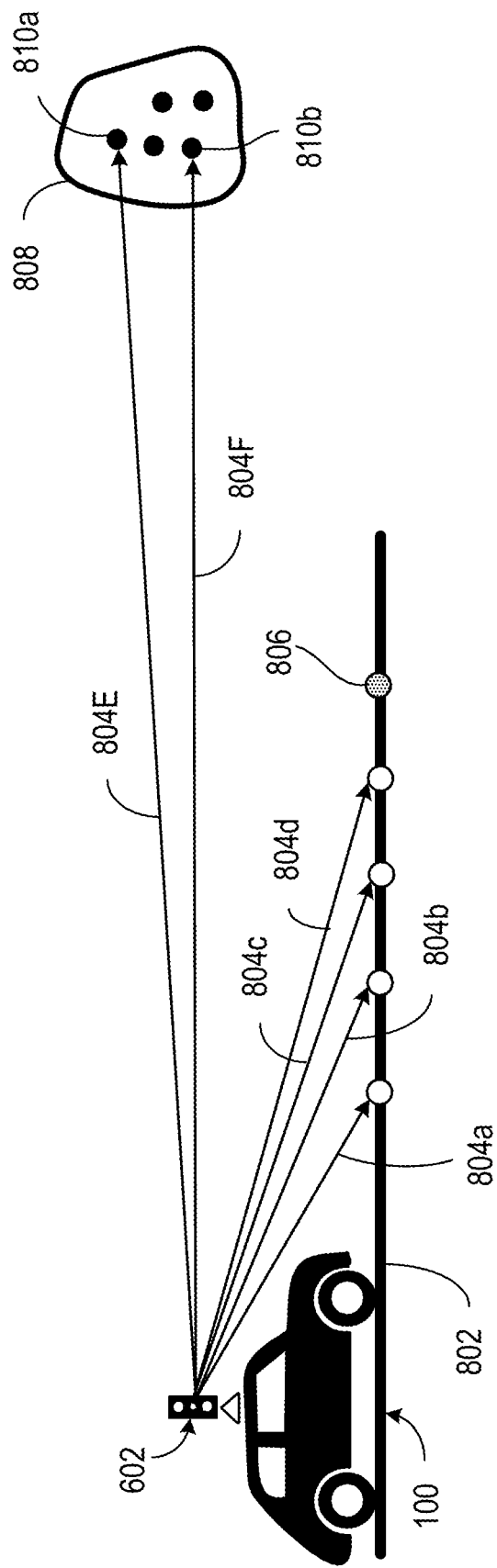
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a*-*d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e*-*f* emitted by the LiDAR system 602 will be reflected from points 810*a*-*b* in a manner inconsistent with the expected consistent manner. From this information, the AV 100 can determine that the object 808 is present.

Path Planning

Figure 9:
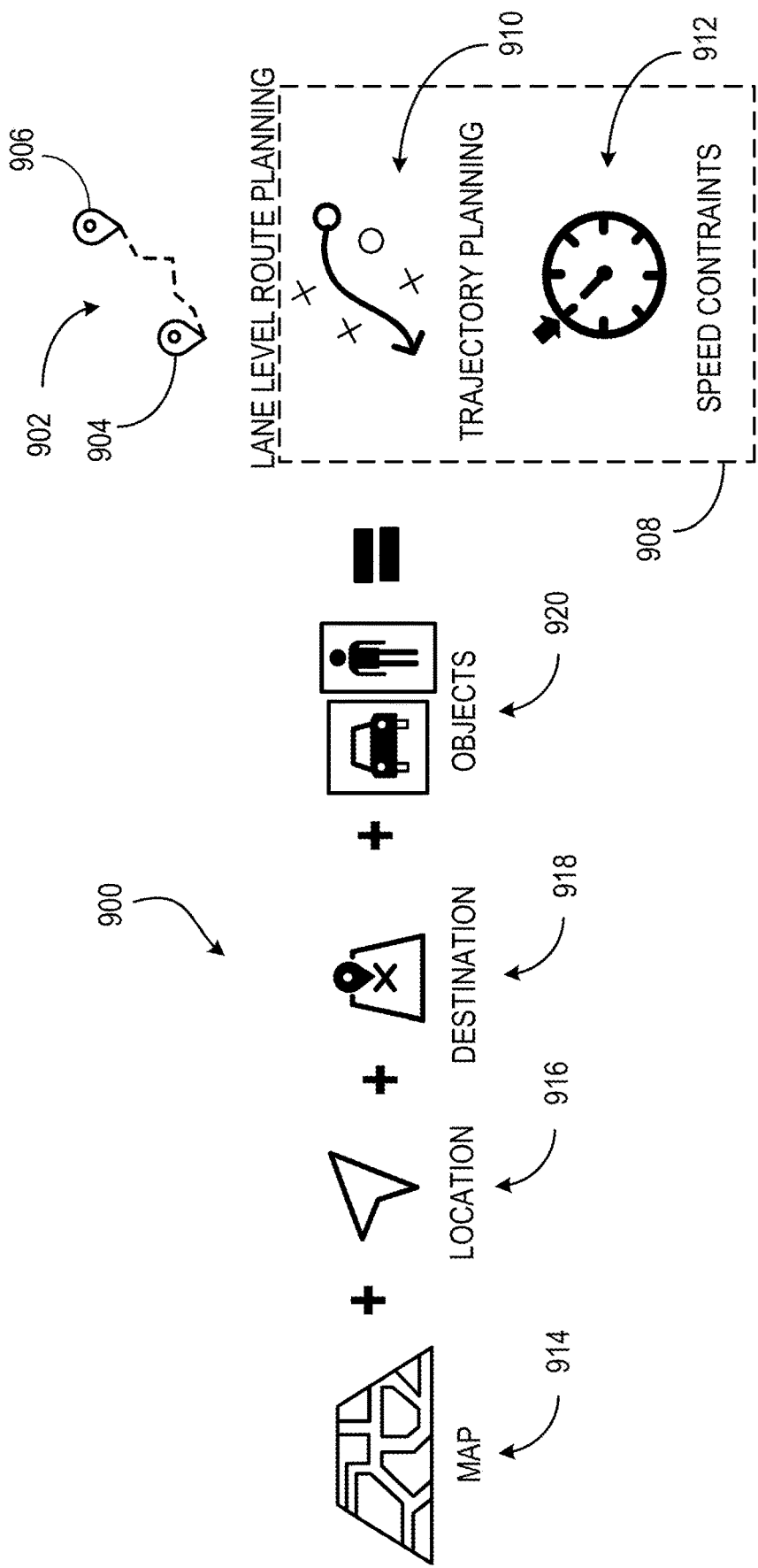
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
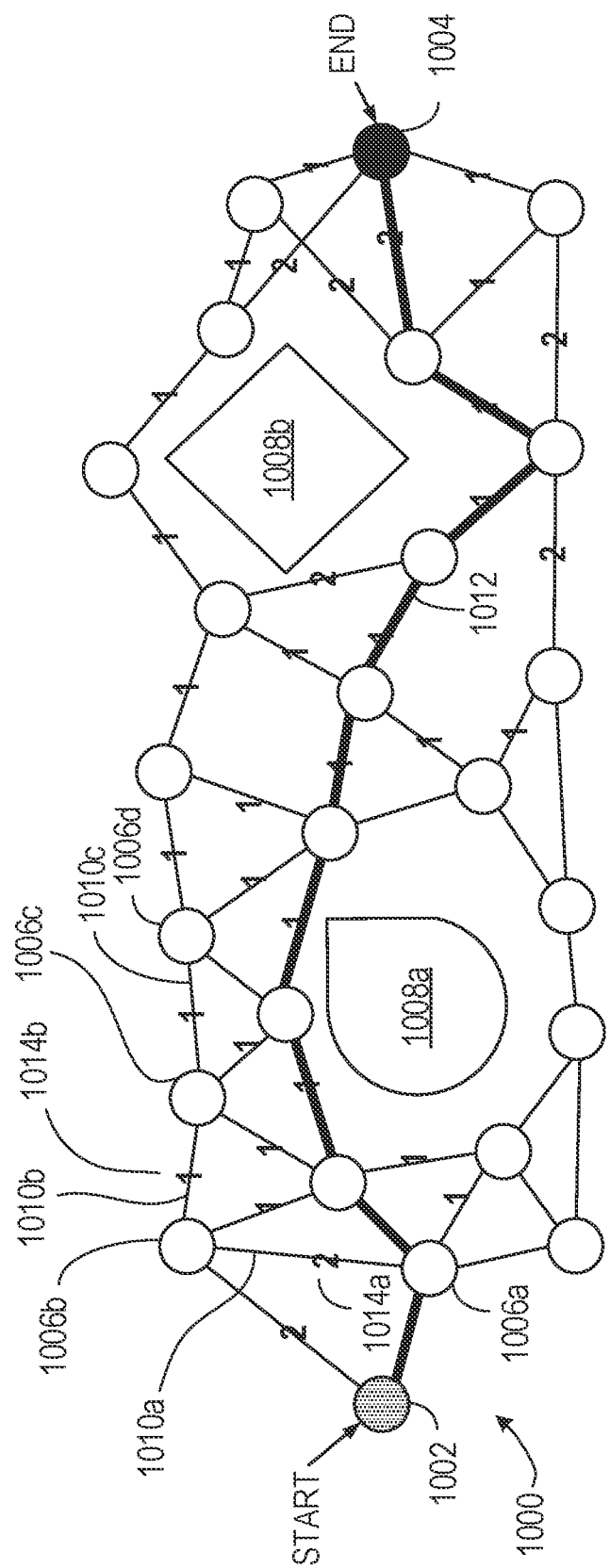
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
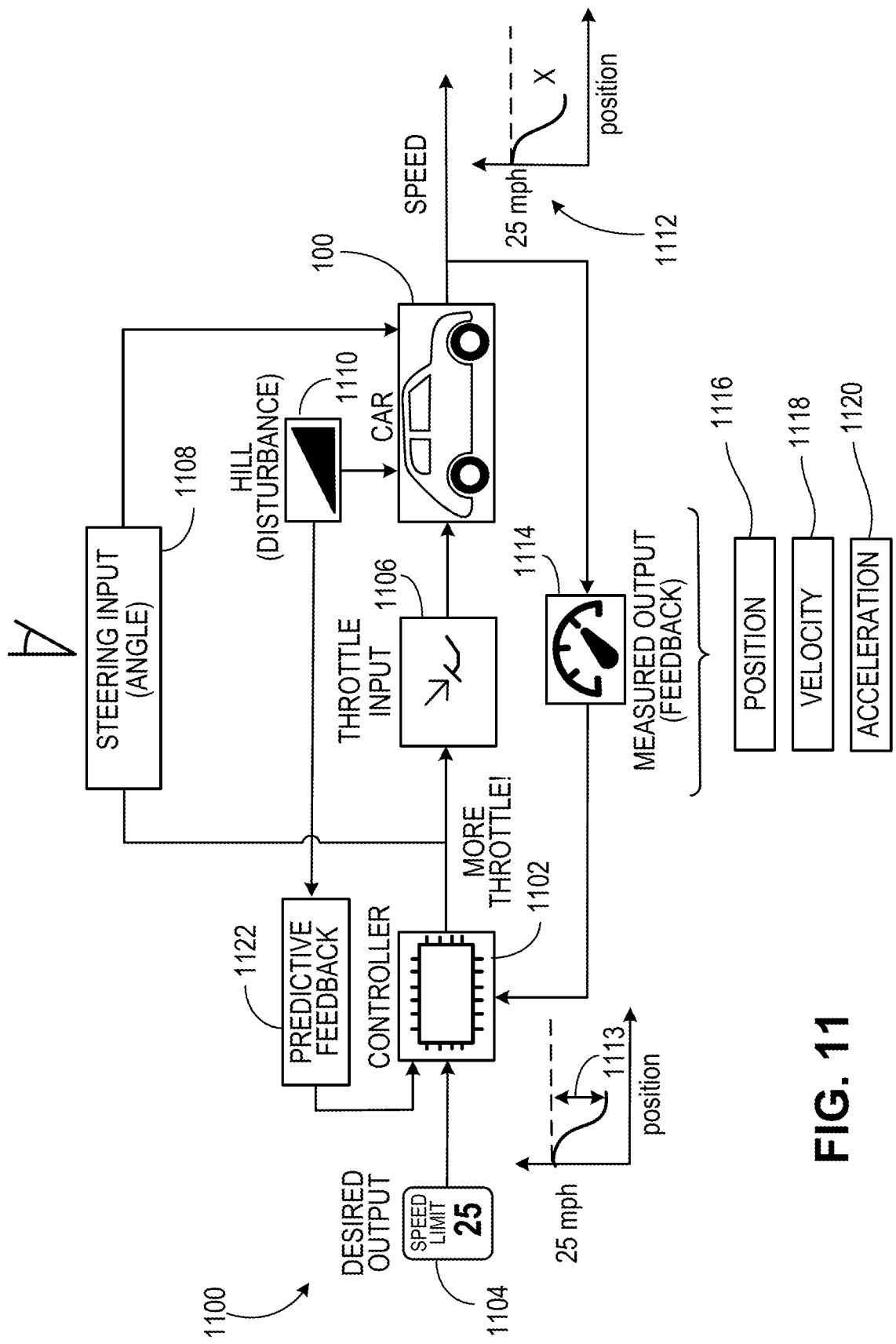
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
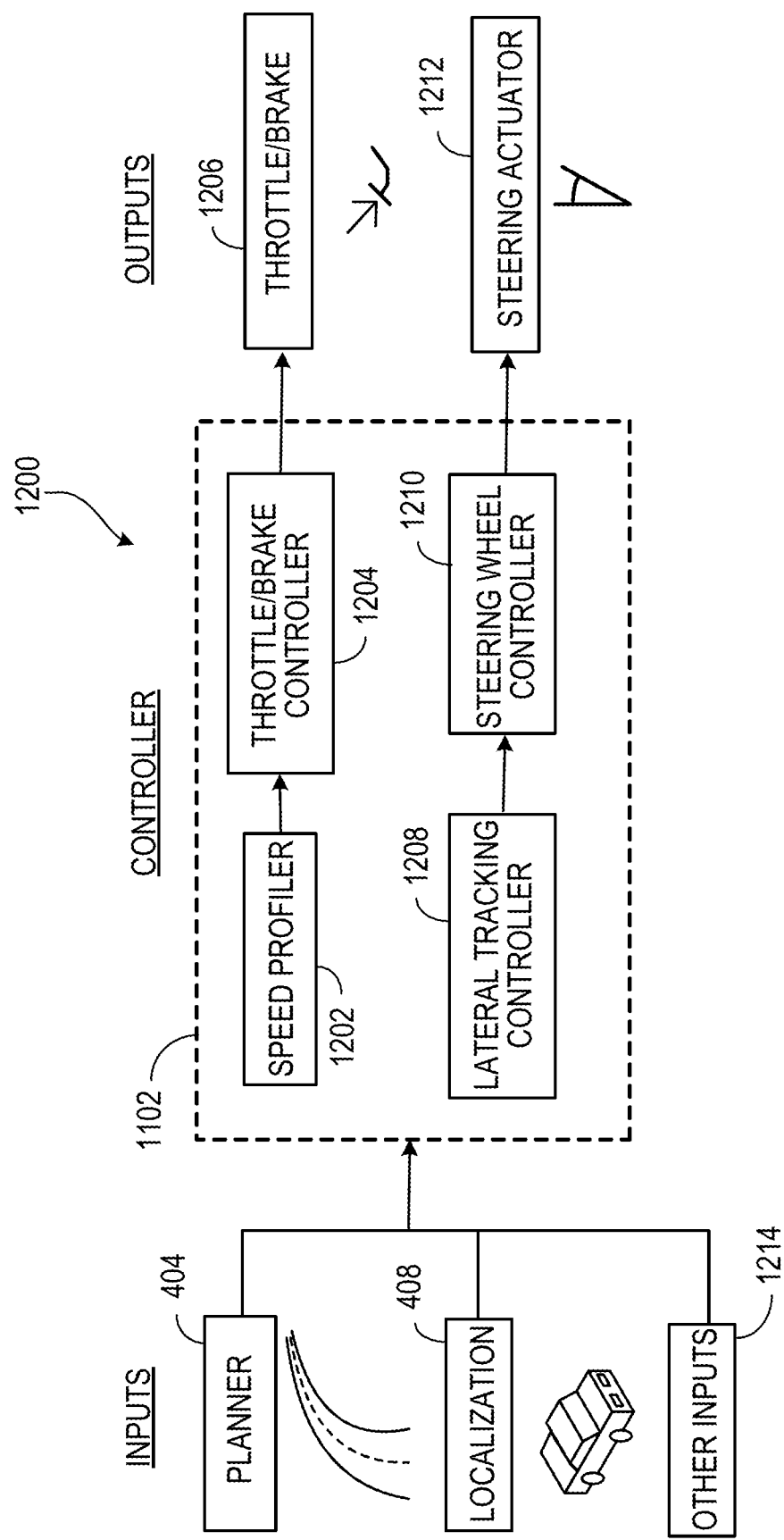
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Operating Environment for Autonomous Vehicle Fleet Management

Figure 13:
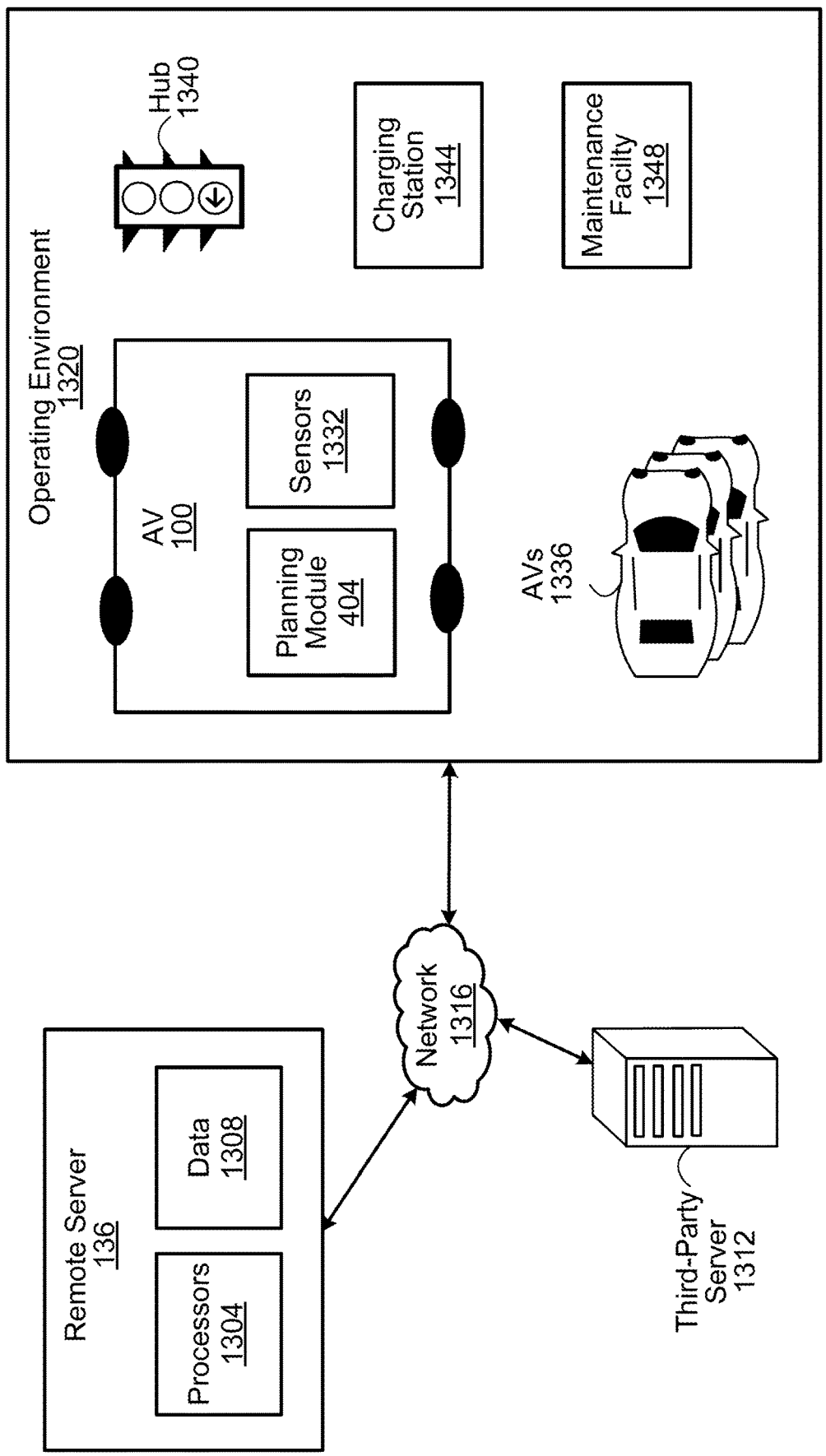
FIG. 13 illustrates a block diagram of an operating environment for autonomous vehicle fleet management, in accordance with one or more embodiments.

FIG. 13 illustrates a block diagram of an operating environment 1320 for autonomous vehicle fleet management, in accordance with one or more embodiments. The block diagram of FIG. 13 includes a remote server 136, the operating environment 1320, a third-party server 1312, and a network 1316. In other embodiments, the block diagram of FIG. 13 includes additional or fewer objects than those described herein.

The remote server 136 is a teleoperation server or a cloud server as illustrated and described above with reference to FIG. 1. The remote server 136 includes one or more processors 1304 and data storage 1308. In some embodiments, the remote server 136 receives a request for a vehicular ride from a user device. For example, the user device is a smartphone, laptop, or tablet of a user that is running a ride hailing app. The ride hailing app is used to request a vehicular ride from the AV 100 or one of the AVs 1336 belonging to an AV fleet managed by the remote server 136. The request includes an initial spatiotemporal location where the user is located and a destination spatiotemporal location where the user would like to travel to. For example, the request specifies user preferences such as a make, a model, a driving mode of the vehicle, or whether the user wants an individual (solo) or shared ride. The AVs 1336 are partly or fully autonomous vehicles and can be examples of the AV 100 described and illustrated above with reference to FIG. 1.

The remote server 136 identifies a vehicle (e.g., the AV 100) that is located within a threshold distance to the initial spatiotemporal location, such that the AV 100 has at least one vacant seat. A vacant seat is detected by the AV 100, for example, using one or more passenger sensors that measure biometric data, body pressure on seats, or pressure on the seat arm rests as described below. A vacant seat can also be known from a vehicle ride profile that stores the number of and details of the passengers for each AV ride. The vehicle ride profile can be stored on the AV 100 or on the remote server 136.

The threshold distance may be set to a larger distance when there are fewer available AVs within the operating environment 1320. For example, the threshold distance ranges between 10 miles and 20 miles when there are fewer available AVs within the operating environment 1320. The threshold distance may be set to a smaller distance when there are more available AVs such that the AV 100 is required to travel a shorter distance to the initial spatiotemporal location. For example, the threshold distance ranges between 1 mile and 5 miles when there are more available AVs such that the AV 100 is required to travel a shorter distance to the initial spatiotemporal location. If the user specifies a solo ride, the AV 100 will be identified only if all its seats are vacant or empty. If the user requests a carpool, the AV 100 will be identified as long as it has a single empty seat.

In some embodiments, the remote server 136 identifies an AV for dispatch based on an operating design domain of the AV. The operating design domain refers to a set of parameters indicating the types of functions and operating environments that the AV is suitable for. The operating design domain is represented using a parameter vector that each AV is associated with. For example, the remote server 136 transmits to the AV a route that the remote server 136 generates for operating the AV in accordance with the parameter vector associated with the AV. Each of the parameters in the parameter vector corresponds to or is associated with a type of function or a characteristic of the operating environment that the AV is suitable for or designed to operate in. For example, the remote server 136 identifies the AV 100 based on a parameter of the parameter vector that represents a type of weather. If it is snowing, the remote server 136 restricts identification to four-wheel-drive vehicles. Each AV transmits a parameter to the remote server 136, as part of telemetry data, indicating whether it is suitable for the current weather. The remote server 136 identifies the AV 100 based on a parameter representing a maximum operating speed of the AV 100. If the user specifies a requirement for a faster ride and the maximum rated operating speed of the AV 100 is only 20 mph, the AV 100 will not be selected. The remote server 136 identifies the AV 100 based on a parameter representing a maximum seating capacity. For example, if the user requests a ride for seven passengers, the AV 100 will be identified only if it has seven vacant seats. The remote server 136 identifies the AV 100 based on a parameter representing a grade of service specified by the user device. For example, if the user requests a luxury car, the AV 100 is identified only if it is a luxury car.

In some embodiments, the remote server 136 receives telemetry data from the AV 100 or another vehicle located within the threshold distance to the initial spatiotemporal location. The telemetry data indicates a respective geographical location of a vehicle. For example, telemetry data includes an indication of a speed of an AV, an indication of a location of an AV, an indication of a heading of an AV, or an indication of a route of an AV. In some embodiments, the telemetry data includes a spatiotemporal location of the vehicle located within the threshold distance to the initial spatiotemporal location. In some embodiments, the identifying of the vehicle located within the threshold distance to the initial spatiotemporal location is performed based on the telemetry data, e.g., location or speed.

The telemetry data includes a video or an image captured by the sensors 1332 of the AV 100. In some embodiments, the telemetry data includes an indication of a classification of an object located on one or more lane segments. The telemetry data includes textual data indicating the location of the object relative to the AV 100. The textual data includes one or more data items in a JavaScript Object Notation (JSON) format. The JSON format is an open-standard file format that uses human-readable text to transmit data objects consisting of attribute-value pairs and array data types or any other serializable value. JSON is used for asynchronous communication between the AV 100 and the remote server 136.

In some embodiments, the AV 100 transmits telemetry data to the remote server 136 indicating that the AV 100 is operating in a busy mode of operation. For example, the busy mode indicates that every seat in the AV 100 is occupied by a passenger, the level of charge of the battery of the AV 100 is low and the AV 100 needs to or is being recharged, or the AV 100 is undergoing maintenance or repairs in the maintenance facility 1348. For example, the remote server 136 is notified not to dispatch the AV 100 to a request from a booking app on a user device if the AV 100 is operating in the busy mode of operation. The AV 100 operates in an available mode of operation when a number of passengers riding within the AV 100 is less than a seating capacity of the AV 100. For example, the AV 100 operates in an available mode of operation if the number of seats in the AV 100 is 7 and only 4 passengers are riding in the AV 100. The AV 100 can thus be used to form a carpool or provide a shared ride. On the other hand, the telemetry data from the AV 100 indicates that the AV 100 is operating in a busy mode of operation even if there are 3 vacant seats but the trunk of the AV 100 is full of luggage. The telemetry data includes one or more data items in a JSON format.

The third-party server 1312 is a server belonging to an entity different from the entity that operates the remote server 136. For example, the third-party server 1312 is operated by another AV fleet provider, the government, or law enforcement. The third-party server 1312 includes one or more processors and data storage. In some embodiments, the third-party server 1312 receives a request for a vehicular ride from a user device and dispatches an AV.

The network 1316 is used to facilitate communication between the remote server 136, the AV 100, the AVs 1336, the third-party server 1312, and in some embodiments, the hub 1340, the charging station 1344, and the maintenance facility 1348. In an embodiment, the network 1316 represents any combination of one or more local networks, wide area networks, or internetworks coupled using wired or wireless links deployed using terrestrial or satellite connections. Data exchanged over the network 1316, is transferred using any number of network layer protocols, such as Internet Protocol (IP), Multiprotocol Label Switching (MPLS), Asynchronous Transfer Mode (ATM), Frame Relay, etc. Furthermore, in embodiments where the network 1316 represents a combination of multiple sub-networks, different network layer protocols are used at each of the underlying sub-networks. In some embodiments, the network 1316 represents one or more interconnected internetworks, such as the public Internet.

The operating environment 1320 represents a geographical area, such as a state, a town, a neighborhood, or a road network. The operating environment 1320 may be an example of the operating environment 190 illustrated and described above with reference to FIG. 1. An AV 100, other AVs 1336, a hub 1340, a charging station 1344, and a maintenance facility 1348 are located within the operating environment 1320. The operating environment 1330 includes objects, which are physical entities external to the AV 100. An object can be static or dynamic. A static object can include but is not limited to the hub 1340, the charging station 1344, the maintenance facility 1348, a road segment, a traffic signal, a building, a parking space located on a road segment, a highway exit or entrance ramp, multiple lanes of a drivable area of the operating environment 1320 orientated in the same direction, an elevation of the drivable area, a curb located adjacent to the drivable area, a median separating two lanes of the drivable area, and any other object that does not move within the operating environment 1320. A dynamic object can include but is not limited to the AVs 1336, a pedestrian, a cyclist, and any other object that moves within the operating environment 1320.

The AV 100 is a partly or fully autonomous vehicle. The AV 100 includes a planning module 404 and sensors 1332. The AV 100 is illustrated and described in greater detail above with reference to FIG. 1. The planning module 404 is illustrated and described above with reference to FIG. 4. In driving mode, the AV 100 uses data from its sensors 1332, for example, LiDAR data or stereo camera data, to detect and classify or label static objects and dynamic objects in the operating environment 1320. The classified/labeled objects and their dynamic characteristics if any, for example, positions, velocities, or headings, are used by the planning module 404 to predict a collision between the AV 100 and objects within the operating environment 1320, to generate a safe trajectory through the operating environment 1320, and to operate the AV 100 to drive through the operating environment 1320 along the safe trajectory.

In some embodiments, the AV 100 receives a request for a vehicular ride from a user device. The AV 100 can receive such a request using its communication devices 140. The request can include an initial spatiotemporal location and a destination spatiotemporal location. The AV 100 transmits the request to the remote server 136. The AV 100 receives a route for operating the AV 100 from the initial spatiotemporal location to the destination spatiotemporal location as determined by the remote server 136. The route determined or generated by the remote server 136 includes one or more lane segments. The remote server 136 determines the route to reduce traffic congestion below a threshold value. For example, the threshold ranges between 50% and 75%. A 0% traffic congestion value means there are few vehicles on the street and all vehicles are operating at the rated speed limit of the street. A 100% traffic congestion value means that traffic has come to a standstill because of the traffic congestion. The remote server 136 thus considers global congestion effects in generating a high-level route to solve the shared AV routing problem.

In some embodiments, the planning module 404 uses the dynamic characteristics of an object to predict that the object will move in a straight line at a constant speed. The planning module 404 can use an extended Kalman filter to estimate a trajectory for the object. The planning module 404 also estimates a point and time of intersection between the estimated trajectory of the object and the planned trajectory of the AV 100. The planning module 404 determines potential behaviors for the object and assigns probabilities to each potential behavior to determine a probability of collision.

Once the AV 100 has received a route generated by the remote server as described above, the planning module 404 generates a trajectory for operating the AV 100. The trajectory is a lower-level result of motion planning that is performed on each lane segment of the route. For example, the trajectory includes speed, acceleration, heading of the AV 100, etc. A perception module 402 identifies an object in the operating environment 1320 using sensor data received from the sensors 1332 of the AV 100 such that a probability of a collision of the AV 100 with the object is greater than a threshold value. For example, the threshold value ranges between 1% and 5%. A probability of a collision of 1% means that there is a 1% chance that the AV 100 will collide with the object.

The perception module 402 is illustrated and described above with respect to FIG. 4. The AV 100 thus performs local motion planning to translate the higher-level route from the remote server 136 into a trajectory. The planning module 404 generates one or more motion segments for the AV 100 to avoid the collision. A high-level route received from the remote server 136 is thus used to generate an optimal local trajectory, reducing fuel use, the distance traveled, and the risk of collision. A different AV can optimize the same route into a different local trajectory based on its own operating parameters and operational design domain.

In some embodiments, the AV 100 includes one or more passenger sensors. The passenger sensors include specialized sensors to record data such as facial expressions of the passenger, skin conductance, pulse and heart-rate, a temperature of the passenger's body, pupil dilation, and pressure on the AV seat arm rests. Each type of data is recorded using a different sensor or a combination of different sensors, for example, heart rate monitors, a sphygmomanometer, a pupilometer, an Infrared thermometer, or a galvanic skin response sensor. The planning module 404 determines a trajectory for the AV 100 to reduce, for example, an elevated heart rate or skin conductance level as detected by the passenger sensors indicative of passenger discomfort or stress. As would be understood by one of ordinary skill, one or more physical measurements of one or more passengers may be correlated with a level of discomfort or stress and that may be adjusted for by a change in trajectory.

In some embodiments, the planning module 404 generates the trajectory such that a level of passenger comfort measured, using the passenger sensors, is above a threshold value. For example, the threshold value ranges between 75% and 90%. A level of passenger comfort of 0% means that the passenger is extremely uncomfortable. Such a level will not normally ever be experienced. A level of passenger comfort of 100% means that the passenger is very comfortable and further changes in the trajectory will not add to the level of passenger comfort. The planning module 404 can select a lower speed or less-aggressive turns to translate the same route into a different trajectory that provides a greater level of passenger comfort. In this manner, the planning module 404 uses motion planning to improve passenger comfort. In other embodiments, motion planning can be performed at the remote server 136 and transmitted to the AV 100.

In some embodiments, the remote server 136 aggregates the road network connectivity of the operating environment 1320 into a congestion-aware representation, such as a graph, a data structure (e.g., a linked list), or a multi-dimensional array. The remote server 136 receives a description of a desired operation for the AV 100 and uses the congestion-aware representation to generate a globally efficient route for the AV 100. In one embodiment, the congestion-aware representation is overlaid on a traffic map. An example congestion-aware representation (graph 1000) is illustrated and described above with reference to FIG. 10. From each vertex, the AV 100 is allowed to move to adjacent vertices as long as the path between them reduces overall traffic congestion across the operating environment 1320.

In some embodiments, the congestion-aware graph representation of the operating environment 1320 is updated in real time using sources of traffic data. In some embodiments, historically stored data is used to augment the congestion-aware representation generation. For example, the historical data of the average time of day at which people leave their offices to drive home is used to determine the times at which a highway is most congested. Such data can be used to generate or augment the congestion-aware representation.

In some embodiments, the remote server generates a congestion-aware representation of multiple lane segments of the operating environment 1320 using the processors 1304. Each lane segment can be a portion of a travel lane or an entire road in the road network of the operating environment 1320. In some embodiments, the congestion-aware representation includes multiple intersections such that each lane segment of operating environment 1320 connects two different intersections of the multiple intersections. In some embodiments, the remote server 136 receives a spatiotemporal location of each other vehicle (e.g., each AV 1336) operating on the multiple lane segments. Each AV 1336 can use its sensors (e.g., GPS, GNSS, IMU) to determine its location and transmit the location as telemetry data to the remote server 136. In these embodiments, the fleet of AVs 1336 can be used as traffic sensors to integrate with other third-party traffic information services as well as exploit connectivity and data transmission options of smart cities.

The edges of the congestion-aware representation graph generated by the remote server 136 are weighted in accordance with a number of other vehicles traveling on the lane segment. The remote server 136 can obtain information from a traffic map to perform the weighting or use location and telemetry data received from the AV 100 and the AVs 1336 to perform the weighting. The traffic information and locations of the AVs 1336 are thus used to construct the weighted graph structure. The remote server 136 updates the weights of the one or more lane segments after receiving the spatiotemporal location of each other vehicle in the operating environment 1320. The benefits and advantages of this approach is that the weighting avoids problems caused by the large number of vehicles involved, for example, when thousands of AVs replace personal vehicles. The embodiments avoid generating routes that may cause congestion.

In some embodiments, each lane segment of the congestion-aware representation is weighted by a number of vehicles operating on the lane segment. The lane segments are weighted to generate the congestion-aware graph representation. For example, the weight is 1 times, 1.5 times, or 3.57 times the number of vehicles operating on the lane segment such that if there are 5 vehicles operating on the lane segment, the weight is 1, 7.5, or 17.85. The route is determined such that an aggregate of weights of one or more lane segments in the route is below a threshold value. For example, the threshold value ranges between 20 and 50. The threshold value is raised or lowered to manage the level of traffic congestion below an acceptable level. In some embodiments, the perception module 402 is used to identify one or more objects located within a threshold distance to the AV 100 using the sensor data from the sensors 1332. The AV 100 transmits telemetry data indicating the one or more objects to the remote server 136 for updating the weights of the lane segments in the congestion-aware representation. For example, by transmitting the information from a fleet of AVs, the AVs are used as traffic sensors to integrate the sensor data with other third party traffic information services.

In some embodiments, the sensor data includes information received wirelessly from traffic signals or the traffic hub 1340. The traffic hub 1340 can be located on a lane segment and the information represents a level of traffic congestion on the lane segment. For example, the hub 1340, smart traffic lights, or other smart city data hubs broadcast up-to-date traffic and construction information such that the AV 100 plans a trajectory to override a portion of the route determined by the remote server 136 but still reach the destination spatiotemporal location. In some embodiments, the AV 100 transmits telemetry data indicating a level of charge of its battery to the remote server 136. The remote server 136, in turn, transmits a route to the AV 100 including instructions to navigate to a spatiotemporal location associated with the electrical charging station 1344.

In some embodiments, the AV 100 transmits telemetry data to the remote server 136 indicating an abnormal operation of the AV 100. For example, the abnormal operation of the AV 100 is an interruption of a network connection between the AV 100 and the remote server 136. The telemetry data can also indicate that the trajectory of the AV 100 is obstructed. The telemetry data can indicate an occurrence of an event with respect to the AV 100. For example, the event is traffic congestion in a region in which the AV 100 is operating. The event can be road construction in a region in which the AV 100 is operating. The event can be a decrease in speed of a traffic pattern along the route of the AV 100.

In some embodiments, the remote server 136 divides or segregates a travel graph or the congestion-aware representation into subgraphs based on the operational design domain capability of each AV. First, the remote server 136 generates the congestion-aware representation for operating multiple AVs as described above. A high-level road network representation is created in the form of a weighted graph. The remote server 136 receives telemetry data from each AV specifying a parameter vector including at least one parameter for operating the AV. For example, a parameter includes a maximum speed limit for the AV. The routing engine in the remote server 136 can thus respect each AV's capabilities. A parameter of the parameter vector can represent one or more operating times when the AV is permitted to drive on the roadways or in the operating environment 1320. A parameter can represent one or more operating weather conditions during which the AV is permitted to drive. A parameter can specify one or more roadways such as city streets or a particular interstate highway. A parameter can include or specify one or more regions denoted by geofences that the AV must respect. The remote server 136 thus respects each AV's capabilities or license for where it is intended or allowed to drive or operate per the operational design domain. The parameters can include a maximum speed limit, operating hours, operating weather conditions, available roadways, geofencing locations, etc.

The remote server 136 identifies a corresponding portion of the congestion-aware representation for each AV. The corresponding portion of the congestion-aware representation includes one or more lane segments of the multiple lane segments for operating the AV in accordance with the telemetry data received from the AV. For example, the routing service of the remote server 136 uses access to the information that identifies a subgraph (a subset of the road-network) that represents the aforementioned limitations for each AV. The remote server 136 receives a request for a vehicular ride from a user device. The request can specify an initial spatiotemporal location and a destination spatiotemporal location. The remote server 136 uses the subdivided representation to identify an AV to provide the vehicular ride such that the initial spatiotemporal location and the destination spatiotemporal location are both located within the portion of the congestion-aware representation corresponding to the identified AV. Therefore, by mapping the AV's operational design domain parameters to the high-level map representation, the navigational safety of individual AVs can be increased and the usage of different types of roads is improved. In some embodiments, the remote server 136 generates a route for operating the identified AV (e.g., the AV 100) such that the route includes a subset of lane segments of the corresponding portion of the congestion-aware representation. For example, a routing engine in the remote server 136 computes a route based on a road-level abstraction of the road network for which information such as the free-flow speed, the capacity, or the length of a given road is available.

In some embodiments, the telemetry data specifies a spatiotemporal location that must be included within the generated route. The generated route therefore includes the specified spatiotemporal location. For example, a constraint within the operational design domain for the AV 101 specifies that the AV 100 must always pass by a client's building or a sponsor's location. Thus, the route developed by the remote server 136 can be tailored to reflect or satisfy certain routing constraints. A receding-horizon control (RHC) policy of a fleet of AVs can add a restriction that routes from point A to B must all pass through some other point C. For example, the route must pass a particular development that is subsidizing the AV ride or the route must not pass by the headquarters of a rival AV company. Model Predictive Control (MPC), which is a method of process control used to control a process while satisfying a set of constraints is a form of RHC.

In some embodiments, the remote server 136 receives a request for an AV ride from a user device at a first time t1. The request for the AV ride specifies a start time t2 later than the first time t1. For example, a ride to the airport is booked for the following day. The remote server 136 determines at time t1 that an operating state of an identified vehicle (e.g., the AV 100) is busy. The remote server 136 determines that the operating state of the AV 100 at the specified start time t2 will be available. For example, the remote server 136 identifies a busy vehicle that is predicted to be available later and reserve it. The remote server 136 transmits a generated route to the AV 100 for operating the AV 100 at the specified start time t2 in accordance with parameters received from the AV 100.

In some embodiments, the AV 100 determines that a level of traffic congestion on a generated route is higher than a threshold value using the portion of the congestion-aware representation corresponding to the identified AV 100. The remote server 100 generates an updated route for the AV 100 including a second subset of the lane segments of the corresponding portion of the congestion-aware representation such that a level of traffic congestion on the updated route is less than the threshold value.

In some embodiments, the congestion-aware representation includes or is subdivided into multiple regions of the operating environment 1320. An example of an operating environment subdivided into regions is illustrated and described below with reference to FIG. 17. For each such region, the congestion-aware representation can include a level of traffic congestion of the region. The congestion-aware representation can specify that "Region R1 has a level of traffic congestion of 75%, while Region R2 has a level of traffic congestion of 5%." In some embodiments, the third-party server 1312 transmits a spatiotemporal location of one or more third-party vehicles to the remote server 136. For example, the third-party server 1312 is a traffic data aggregator or may be routing its own AVs. The remote server 136 uses the received spatiotemporal locations of the third-party vehicles to update the level of traffic congestion of each region in the congestion-aware representation. Thus, the traffic graph can be updated using third-party data.

In some embodiments, the server 136 identifies a third-party vehicle using the updated level of traffic congestion for each region, such that the identified third-party vehicle is operating within a region that has a level of traffic congestion above a threshold value. Thus the remote server 136 can share rerouting information with independent or third-party AV fleet operators. The remote server 136 generates rerouting information for the identified third-party vehicle using the updated level of traffic congestion for each region. The rerouting information specifies one or more lane segments located outside the region that has a level of traffic congestion above a threshold value. By using third-party traffic information, local congestion minima and maxima can be avoided to generate a globally optimal solution to reduce traffic congestion. The remote server 136 transmits the rerouting information for the identified third-party vehicle to the third-party server 1312. The independent AV operators can therefore use a shared traffic congestion map in conjunction with the routing algorithms of the remote server 136 to develop globally optimal routing to reduce traffic congestion.

In some embodiments, the congestion-aware representation includes a level of risk associated with operating a vehicle on each lane segment of the multiple lane segments of the operating environment 1320. For example, the remote server 136 evaluates a frequency of accidents that have occurred on certain routes to improve navigational safety. In some embodiments, the remote server 136 generates rerouting information for a third-party vehicle using the level of risk associated with operating a vehicle on each lane segment.

The remote server 136 determines a route for operating the AV 100 from the initial spatiotemporal location to the destination spatiotemporal location. The route can be a high-level level route that includes one or more lane segments of the operating environment 1320. The route is determined such that an aggregate of weights of the one or more lane segments included in the route is below a threshold value as described above with reference to FIGS. 10 and 13. For example, when the threshold value used is lower, the AV 100 will encounter fewer other vehicles and less traffic on the route. When the threshold value used is higher (e.g., during rush hour), the AV 100 will encounter more vehicles and traffic on the route. The remote server 136 transmits the received request and the determined route to the AV 100. The transmission is performed using the network 1316 and the communications devices 140 illustrated and described above with reference to FIG. 1. The remote server 136 transmits an identity of the identified vehicle (AV 100) and the determined route to the user device. For example, a license plate, a make, or a model of the AV 100 is transmitted. The user is therefore made aware of the availability of an AV and its identity to improve security. The embodiments thus provide a mobility-on-demand service to travelers.

In some embodiments, the remote server 136 determines the route based on a type of lane segment specified by the user device. For example, the user specifies that she wishes to travel only along highways or city roads. The capabilities of the AV 100 are also taken into account to determine an optimal route. In some embodiments, the remote server 136 determines the route based on an operational constraint of the vehicle. For example, if the AV 100 is better suited to city roads than to highway route, the remote server 136 will use only city roads to plot the route.

In some embodiments, the AV 100 determines that a network connection is dropped between the remote server 136 and the AV 100. The AV 100 navigates in accordance with a stored copy of the route using its control module 406. The control module 406 is illustrated and described in more detail above with reference to FIG. 4. For example, a broken connection to the cloud is detected by the AV 100. The local router in the planning module 404 in the AV 100 takes over routing the AV 100 to the destination. For example, multiple destination locations are stored in the AV 100 and executed in order.

In some embodiments, the remote server 136 receives notification of an emergency that the AV 100 cannot perceive yet. The remote server 136 overrides the AV 100's current route to increase safety or reduce driving time. For example, the remote server 136 transmits to the AV 100 a first route for operating the AV 100. The first route includes multiple lane segments. The remote server 136 determines a make and model of the AV 100. A level of resolution of the first route that is transmitted to the AV 100 is based on the make or model of the AV 100. In this manner, the high-level routing map can be tailored to respect the driving capabilities of each AV. For example, the route includes more segments for a "newer" model of an AV.

The remote server 136 can receives a notification that one or more lane segments of the route are associated with an event. For example, a collision has occurred on the route, a portion of the route may have flooded, a new construction zone has come up on the route even though traffic congestion has not yet built up at the problem zone, or a public event such as a sporting event or music concert is taking place on the route, thus increasing the traffic on the route. The remote server 136 transmits to the AV 100 a request for a spatiotemporal location of the AV 100. The remote server 136 receives the spatiotemporal location of the AV 100 and analyzes the spatiotemporal location of the AV 100 using the congestion-aware representation. The remote server 136 may determine that the AV 100 is located on a lane segment that is different from the one or more lane segments associated with the event. For example, the remote server 136 determines that the AV 100 has not approached a collision site yet so it is not too late to override the current route. Responsive to the determining that the AV 100 is located on a lane segment different from the one or more lane segments, the remote server 136 generates a second route for operating the AV 100. The second route avoids the one or more lane segments associated with the event. Thus, the congestion of traffic caused by both external as well as internal emergencies can be reduced. The embodiments disclosed herein also reduce the strain on local law enforcement and traffic control. The remote server 136 transmits information representing the second route to the AV 100 and instructs the AV 100 to abandon the first route. For example, an automated or semi-manual re-dispatch is performed from the remote server 136 or an AV command center to alter or adjust the route for the AV 100.

In some embodiments, the remote server 136 receives a request for routing information from the third-party server 1312. The request references the one or more lane segments associated with the event. For example, the third-part server 1312 belongs to another AV ride provider that wishes to use the routing engine in the remote server 136. The remote server 136 transmits the information representing the second route to the third-party server 1312. For example, traffic information is published to third parties, such that the AV fleet 1336 is used as multiple traffic sensors to integrate with other third party traffic information services.

In some embodiments, the remote server 136 determines that a battery level of the AV 100 is less than a threshold value. For example, the threshold level ranges between 10% and 20%. Responsive to determining that the AV 100 has in fact completed the second route, the remote server 136 directs the AV 100 to the charging station 1344. In some embodiments, the remote server 136 determines that a maintenance time of the AV 100 has been exceeded. Responsive to determining that the AV 100 has completed the second route, the remote server 136 directs the AV 100 to the maintenance facility 1348. In some embodiments, the remote server 136 determines based on data received from the passenger sensors of the AV 100 that a passenger is riding in the AV 100. The remote server 136 generates a graphical user interface including a representation of the second route to alert the passenger of the event and the switch to the second route.

In some embodiments, the remote server 136 receives a voice command from the passenger via a smart speaker of the AV 100. The voice command can be directed to the graphical user interface. The smart speaker is a component of the AV 100 that receives voice commands from a passenger riding in the AV 100. The smart speaker includes one or more near-field or far-field microphones to receive the commands. The smart speaker can also deliver audio messages from the remote server 136 to a passenger. In some embodiments, the smart speaker includes or is connected to a smart assistant of the remote server 136. The smart assistant can look up information, such as weather, route planning, etc., and also deliver alerts to the passenger about impending maneuvers. In some embodiments, the smart speaker is used as an input device to receive passenger input in the form of voice commands. The smart speaker can translate voice commands to data usable by the planning module 404 for trajectory generation or modification. In some embodiments, the smart speaker transmits audio output describing a maneuver responsive to receiving a voice command.

The remote server 136 generates audio output describing the event and the second route that is transmitted to the AV 100. In some embodiments, the remote server 136 updates the graphical user interface by adding a graph describing the second route to the graphical user interface. The graphical user interface can include one or more computer-executable semantic icons. The remote server 136 can receive passenger input directed to the second route using a computer-executable semantic icon on the graphical user interface. Responsive to receiving the passenger input, the remote server 136 displays text representing the second route on the display device 312 of the AV 100. The display device 312 is illustrated and described in more detail above with reference to FIG. 3.

The sensors 1332 of the AV 100 can include visual sensors that sense a state of the operating environment 1320, such as the presence of the AVs 1336, the hub 1340, etc. The sensors 1332 are communicatively coupled to the perception module 402 to transmit the sensor data. The sensors 1332 can include one or more monocular or stereo video cameras in the visible light, infrared or thermal (or both) spectra, LiDAR, RADAR, ultrasonic sensors, time-of-flight (TOF) depth sensors, and may include temperature sensors, humidity sensors, or precipitation sensors. The sensors 1332 can be an example of the sensors 122-123 illustrated and described above with reference to FIG. 1.

In some embodiments, the sensor data includes LiDAR point cloud data or camera images. The LiDAR sensors of the AV 100 are used to illuminate a target, for example, the hub 1340, with pulsed laser light and measure the reflected pulses. Differences in laser return times and wavelengths can then be used to generate the sensor data and create a digital 3-D representation (feature) of the target. In some embodiments, the LiDAR point cloud data is stored as a multidimensional occupancy grid. The LiDAR point cloud data is pre-processed at the signal level and then processed at a higher level to extract features of the target. In some embodiments, a combination two- and three-dimensional grid structure is used and the space in these structures is tessellated into several discrete cells. The structure of the LiDAR point cloud data allows a large amount of raw measurement data to be handled by the AV 100.

The hub 1340 is a unit of a smart city infrastructure that is connected to the network 1316 and can communicate with the AV 100 and AVs 1336. The hub 1340 can be a smart traffic signal and can include sensors such as cameras. The hub 1340 can receive, capture, or transmit traffic information or routing information to the remote server 136 or the AV 100.

The charging station 1344, also called an EV charging station or electric recharging point, is an element in an infrastructure that supplies electric energy for the recharging of plug-in electric vehicles—including electric cars, neighborhood electric vehicles and plug-in hybrids. The AV 100 can have an onboard converter that plugs into a standard electrical outlet or a high-capacity appliance outlet in the charging station 1344. The charging station 1344 can provide electrical conversion, monitoring, or safety functionality. The charging station 1344 can support faster charging at higher voltages and currents than are available in residences. The charging station 1344 can be an on-street facility provided by an electric utility company or located at a retail shopping center, a restaurant or a parking place. The charging station 1344 can be a smart entity in an infrastructure and can include sensors such as cameras. The charging station 1344 can receive, capture, or transmit traffic information or routing information to the remote server 136 or the AV 100. The maintenance facility 1348 is an AV repair shop where the AVs 1336 can be repaired or serviced. The charging station 1344 can be a smart entity in an infrastructure and can include sensors such as cameras. The charging station 1344 can receive, capture, or transmit traffic information or routing information to the remote server 136 or the AV 100.

Examples of Autonomous Vehicle Fleet Management

Figure 14:
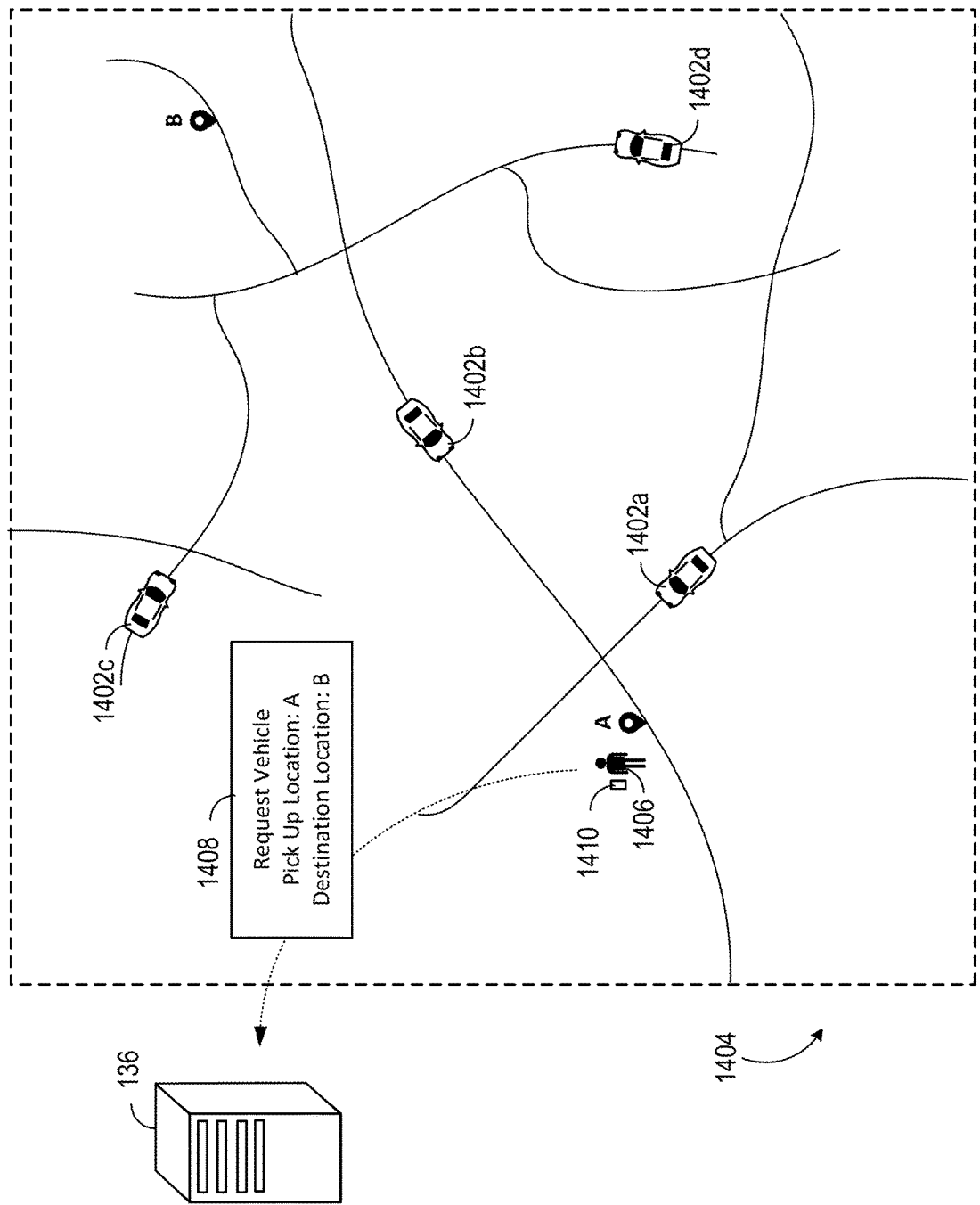
FIGS. 14-18 illustrate examples of autonomous vehicle fleet management, in accordance with one or more embodiments.

FIG. 14 illustrates an example of autonomous vehicle fleet management, in accordance with one or more embodiments. In this example, the remote server 136 communicates with the AVs 1402*a-d* (e.g., via the network 1316). In some embodiments, one or more of the AVs 1402*a-d* are implemented in a similar manner as the AV 100 described with respect to FIG. 1.

Each of the AVs 1402*a-d* is positioned in a geographical region 1404. The geographical region 1404 can correspond to a particular political region (e.g., a particular country, state, county, province, city, town, borough, or other political region), a particular pre-defined region (e.g., a region having particular pre-defined boundaries such as a software determined geo-fenced area), a transiently-defined region (e.g., a region having dynamic boundaries such as a group of streets affected by dense traffic), or any other region.

In this example, a user 1406 positioned at a location "A" wishes to travel to a location "B" in an AV. To request an AV for use, the user 1406 transmits a request 1408 to the remote server 136 (e.g., via a user device 1410, such as a smartphone, tablet computer, or wearable computing device). In some embodiments, the request 1408 includes one or more data items indicating the user's desired pick up location (e.g., the current location of the user or another pick up location specified by the user), a desired pick up time, and/or a desired destination location (e.g., a destination location specified by the user).

Responsive to the request 1408, the remote server 136 selects one of the AVs 1402*a-d* to fulfill the request. The remote server 136 considers one or more different criteria in selecting an AV. As an example, the remote server 136 determines which of the AVs is currently available (e.g., is not currently assigned to transport a passenger and/or cargo, and/or is not actively transporting a passenger and/or cargo), and select one of the available AVs for assignment to the user 1406. As another example, the remote server 136 considers whether an AV is currently unavailable, but is anticipated to be available in the future (e.g., an AV that is currently assigned to another task, but is anticipated to complete its task sufficiently soon for subsequent assignment to the user 1406 and arrival at the user's desired pick up location at the desired time). In some embodiments, the remote server 136 prioritizes certain AVs for selection over others (e.g., based on the proximity of the AVs with respect to the user 1406, the orientation or heading of the AVs with respect to the user 1406, time and/or ease in which the AVs can reach the user 1406, the ability for AVs to navigate to users while minimally affecting traffic flows, etc.).

The remote server 136 selects the AV 1402*a* for assignment to the user 1406. The remote server 136 transmits instructions to the AV 1402*a* instructing the AV 1402*a* to fulfill the user's request. In some embodiments, the instructions include one or more data items indicating a pick up location for the user 1406 (e.g., the pickup location specified by the user), a pick up time, and/or the destination location (e.g., the destination location specified by the user). The AV 1402*a* navigates to the specified pick up location (e.g., the location A) to pick up the user 1406 (along with her travel party and/or any cargo, if applicable) at the specified time. Once the user 1406 has boarded the AV 1402*a*, the AV 1402*a* navigates to the destination location (e.g., the location B along a route). Upon reaching the destination location, the AV 1402*a* stops, and allows the user 1406 to disembark. The AV 1402*a* is then made available for use by others (e.g., to transport one or more other users and/or cargo).

The route of the AV 1402*a* can be determined by the AV 1402*a* itself and/or by the remote server 136. For instance, in some implementations, the AV 1402*a* determines a route of travel based on its current location and its goal location (e.g., the specified pick up location and/or the specified destination location). In some implementations, the remote server 136 determines a route of travel for the AV 1402*a*, and transmits the determined route to the AV 1402*a*. The remote server 136 generates the route, as described above with reference to FIG. 13 to reduce the overall traffic congestion in the region 1404.

The operation of the remote server 136 can provide various technical benefits. As an example, the remote server 136 facilitates the automatic operation of a fleet of AVs, enabling AVs to fulfill requests in an automated manner without human intervention. Further, the remote server 136 can automatically control the operation of the fleet of AVs such that requests are fulfilled in an efficient and effective manner (e.g., by reducing the overall traffic congestion).

In some implementations, an AV is used to transport cargo (e.g., packages, items, or other objects) instead of or in addition to transporting passengers. For instance, a user can transmit a request to the remote server 136 indicating a desired pick up location (e.g., a location of cargo), a desired pick up time, and/or a desired destination location (e.g., a destination location where the cargo is to be delivered). In response to the request, the remote server 136 assigns an AV to transport the cargo, and transmit command signals to the AV specifying the pickup and destination locations and pick up time (e.g., in a similar manner as described with respect to FIG. 14).

In some implementations, two or more AVs are positioned at a similar location at a similar time, and/or have a similar destination location. The remote server 136 can provide different routes to one or more of the AVs, such that their impact on vehicular traffic in the transportation network is reduced. For instance, if multiple AVs were to be assigned an identical route to a destination location, each of the AVs would travel along the same roads of the transportation network. This can potentially increase the congestion of those roads, and decrease the effective travel speed across them. As an alternative, one or more AVs can be assigned to an alternative route to the destination, such that their impact is not concentrated to a single route (e.g., as it is instead spread among several different roads).

The AVs 1402*a* and 1402*b* can be positioned at a similar location (e.g., in proximity to a pick up location A) and be assigned to travel to a similar destination location (e.g., to a specified location B). To mitigate road congestion, the remote server 136 can transmit first instructions to AV 1402*a* including instructions to navigate to the destination location along a first route, and second instructions to 1402*b* including instructions to navigate to the destination location along a different route. The routes can be different from one another, and utilize at least some different roads from one another. Accordingly, the impact on traffic flows and route conditions of the AVs is spread among different routes, rather than concentrated on a single route. In some embodiments, the remote server 136 estimates a future level of traffic congestion, and preemptively directs AVs away from certain locations to better reduce the level of traffic congestion.

Figure 15:
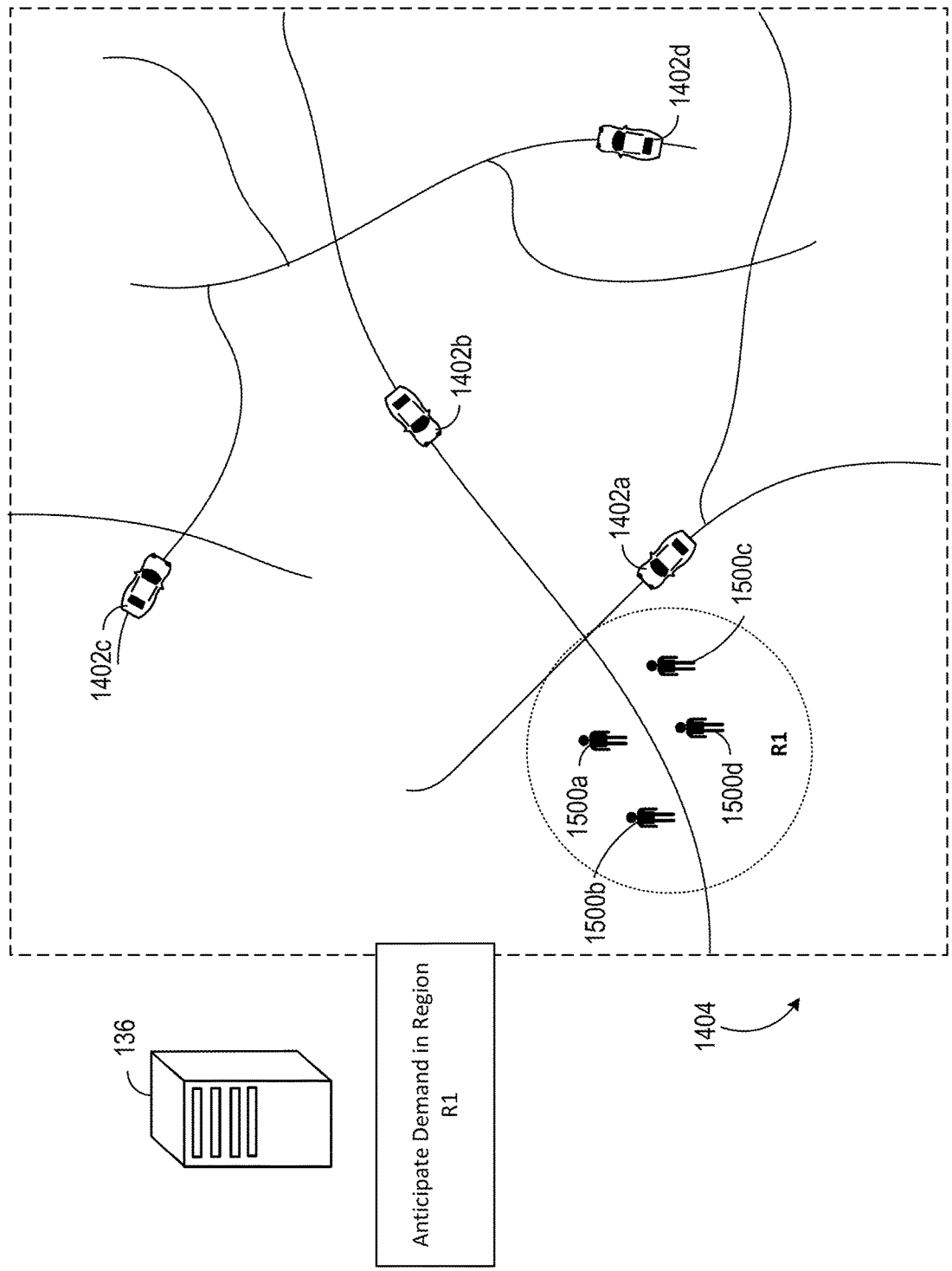

FIG. 15 illustrates an example of autonomous vehicle fleet management, in accordance with one or more embodiments. FIG. 15 shows a region 1404 having several AVs 1402*a-d* and several users 1500*a-d*. In this example, none of the users 1500*a-d* have yet submitted a request for use of an autonomous vehicle. Nevertheless, the remote server 136 has estimated that there will be a future demand in a region R1.

In response, the remote server 136 transmits instructions or information to some or all of the AVs 1402*a-d* to reposition those AVs in anticipation of the estimated future demand. For instance, the remote server 136 can determine that three additional vehicles are needed in the region R1 to fulfill the estimated demand, and thus transmit instructions or information to each of the AVs 1402*a-c* instructing them to travel to the region R1.

In response to receiving the instructions or information, the AVs 1402*a-c* navigate to the region R1. The remote server 136 can estimate future demand and traffic congestion using a variety of different techniques. In some embodiments, the remote server 136 collects current and/and historical information regarding one or more users and their behavior, one or more AVs and their operation, the environment of the users and/or AVs, the usage of the AVs, and other factors that can potentially indicate or influence future demand. Using this information as inputs, the remote server 136 can generate a predictive model to estimate the future demand with respect to one or more particular regions or locations and with respect to one or more particular spans or points in item. In some embodiments, the predictive model is a machine learning model that receives as input the current information regarding one or more users, one or more AVs, or the operating environment and generates as output the future demand with respect to one or more particular regions or locations. In some embodiments, the predictive model is implemented using a look-up table for the operating environment 1320.

In an embodiment, the AV system 120 (illustrated and described above with reference to FIG. 1) receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the remote server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information include, for example, other AVs, remote servers 136, or specific third party AV systems.

In an embodiment, the AV system 120 or the remote server 136 determines if certain information associated with a passenger can be accessed by the AV 100 or another entity. For example, a third-party AV system that attempts to access passenger input related to a particular spatiotemporal location must obtain authorization, e.g., from the AV system 120 or the remote server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

As another example, the remote server 136 collects vehicle telemetry data from one or more of the AVs. Vehicle telemetry data can include information regarding the current operation of one or more AVs (e.g., an autonomous vehicle's location, speed, heading, orientation, route, path, etc.). Vehicle telemetry data can also include information regarding the historical behavior of one or more users (e.g., the previous locations of the autonomous and the associated time, previous routes taken by the autonomous vehicle and the associated time, etc.). Vehicle telemetry data can include information regarding the current or historical environmental conditions observed by one or more AVs (e.g., a traffic condition of a road observed by the autonomous vehicle, a closure or an obstruction of a road observed by the autonomous vehicle, an object or hazard observed by the autonomous vehicle, etc.).

As another example, the remote server 136 collects event information regarding one or more events that have occurred in the past, are currently occurring, and/or are expected to occur in the future. Example events include civic events (e.g., parades, sports events, festivals, concerts, etc.), traffic events (e.g., road closures, detours, congestion, change in a direction of traffic flow, etc.), and weather events (e.g., rain, flooding, wind, fog, lightning, snow, ice, sleet, etc.), among others. In some embodiments, the remote server 136 collects historical information regarding one or more events (e.g., information describing the occurrence of an event, the time at which in occurred, and the location of occurrence). In some embodiments, the remote server 136 collects information regarding one or more currently occurring events (e.g., information describing the occurrence of an event, the time of occurrence, and the location of occurrence). In some embodiments, the remote server 136 collects information regarding one or more planned events in the future (e.g., information describing the anticipated occurrence of an event, the anticipated time of occurrence, and the anticipated location of occurrence). In some embodiments, the remote server 136 estimates or predicts the future occurrence of one or more events (e.g., based on a predictive model using collected event information as inputs). In some implementations, event information is collected from one or more devices associated with one or more users, the AVs, and/or from third-parties (e.g., a transportation authority, weather information service, traffic information service, governmental agency or organization, etc.).

Using these types of information as inputs, the remote server 136 can generate a statistical model (e.g., a predictive model, a stochastic model, a regression model etc.) to estimate future traffic with respect to one or more particular regions or locations and with respect to one or more particular spans or points in item. As an example, the remote server 136 estimates future traffic based on a statistical model (e.g., a Bayesian statistical model). For instance, a statistical model can be generated based on the user profile data, the vehicle telemetry data, event information, and other information collected by the remote server 136. Using the statistical model, the remote server 136 can identify one or more factors or conditions correlating with an increased or decreased likelihood that a user will submit a request for use of an autonomous vehicle at a particular region or location, and at a particular time. Using this information, the remote server 136 can identify particular regions or locations that are associated with a higher likelihood of having traffic at particular times. Similarly, future demand estimates can be generated using stochastic differential equations describing demand evolution and generation across a range of different locations, regions, and/or time, and/or these estimates can be aggregated together to determine an overall estimated future traffic. The region R1 corresponds to the geographical location of several users 1500*a-d*. However, this is merely an illustrative example. In practice, a geographical concentration of users can be but one factor in estimating future traffic. Further, although a region R1 is shown, this is also merely an illustrative example. In practice, the remote server 136 can estimate future traffic with respect to a more specific geographical area (e.g., a specific location) or more general geographical area (e.g., a larger geographical region).

Further, the remote server 136 can estimate future traffic with respect to a relatively specific range of time (e.g., an instantaneous point in time) or a relatively broader range of time (e.g., a range of time on the order of seconds, minutes, hours, days, weeks, months, seasons, years, or other ranges of time). Further still, the remote server 136 can estimate future traffic for a relatively nearer time in the future (e.g., on the order of seconds or minutes in the future), to for a relatively further time in the future (e.g., on the order of hours, days, weeks, months, or years in the future). Further, upon estimating future traffic, the remote server 136 can delay transmitting instructions to AVs in accordance with the estimated future traffic.

Figure 16:
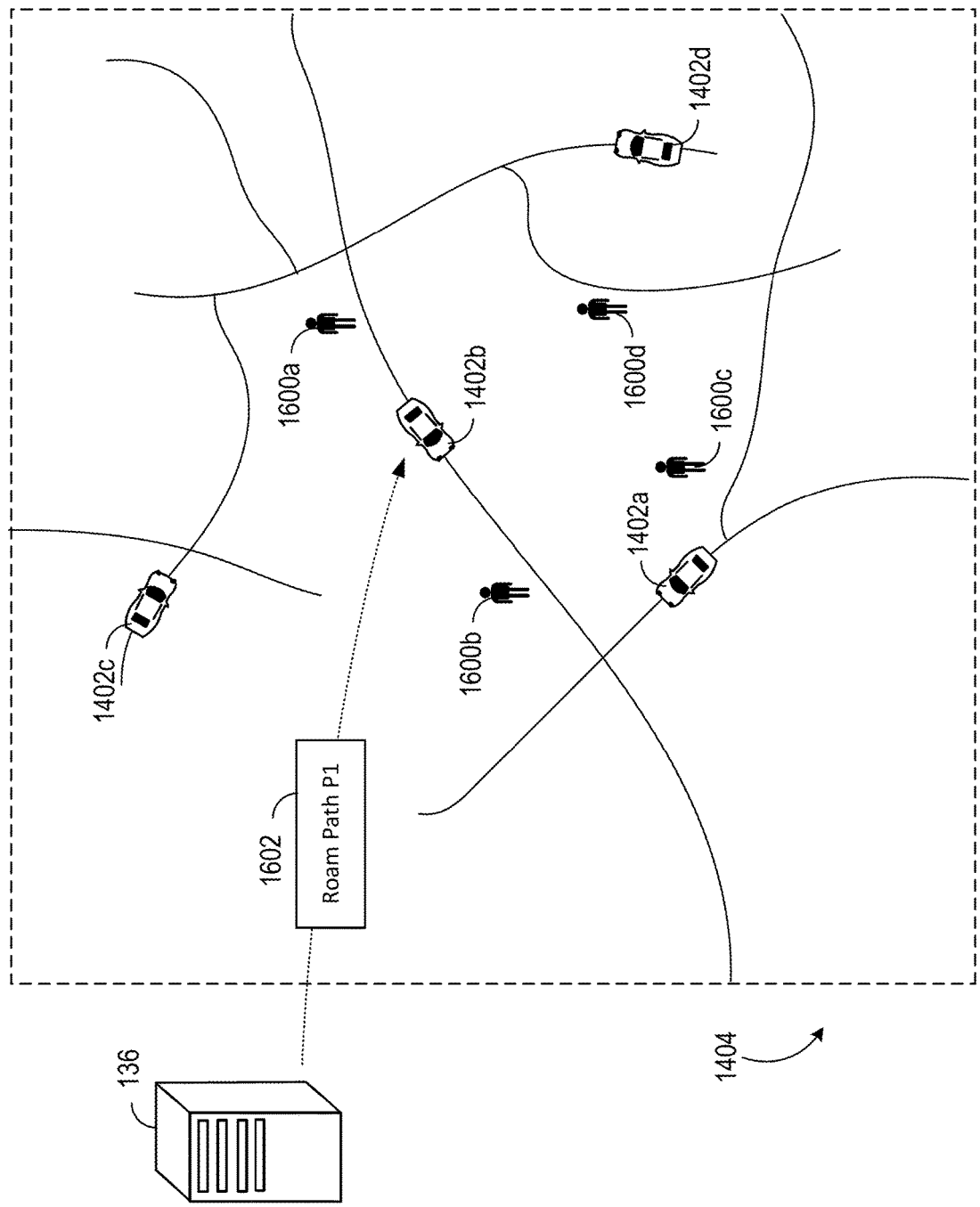

FIG. 16 illustrates an example of autonomous vehicle fleet management, in accordance with one or more embodiments. In some embodiments, the remote server 136 instructs one or more AVs to "roam" in a particular region or along a particular path (e.g., to reduce traffic in other locations). FIG. 16 shows a region 1404 having several AVs 1402*a-d* and several users 1600*a-d*. In this example, none of the users 1600*a-d* have yet submitted a request for use of an autonomous vehicle. Further, the autonomous vehicle 1402*b* is not actively transporting a user or cargo, and has not yet been assigned to transport a user or cargo. Rather than having the autonomous vehicle 1402*b* be idle where several idle AVs can cause congestion, the remote server 136 transmits an instruction 1602 to the AV 1402*b* instructing the autonomous vehicle 1402*b* to "roam" along a path P1. In response, the AV 1402*b* navigates the path P1 (e.g., until it is assigned to transport a user or cargo, or assigned to some other task).

In some embodiments, the remote server 136 specifies the roaming path based on information regarding the known and/or predicted locations of users. For example, the remote server 136 collects traffic data including the current locations of other vehicles. Based on this information, the remote server 136 can define a roaming path such that an AV travels into an area of less congestion. As another example, the remote server 136 uses a statistical model to estimate future traffic congestion. Based on this information, the remote server 136 can define a roaming path such that an AV travels away from traffic congestion. In some embodiments, the remote server 136 can generate different roaming paths for different AVs such that each autonomous vehicle roams in a different region and/or along a different path (e.g., to reduce congestion).

In some embodiments, the remote server 136 instructs one or more AVs to "idle" at a particular location (e.g., to await a potential user or cargo to transport, or assignment to another task). For example, the region 1404 has several idle AVs 1402*a-d*. In this example, the autonomous vehicle 1402*b* is not actively transporting a user or cargo, and has not yet been assigned to transport a user or cargo. Rather than having the AV 1402*b* drive on a street and add to traffic, the remote server 136 can transmit an instruction to the AV 1402*b* instructing the AV 1402*b* to navigate to a parking area or designed waiting area and idle or park (e.g., until the AV is assigned another task). In response, the AV 1402*b* navigates to the parking area or designed waiting area and remains there (e.g., until it is assigned to transport a user or cargo, or assigned to some other task).

In some embodiments, the remote server 136 prioritizes the performance of certain tasks over the performance of other tasks to reduce traffic congestion. For instance, the remote server 136 can prioritize fulfilling requests for transporting users (e.g., to convey users between different locations) over requests for transporting cargo (e.g., to convey cargo between different locations). Further, when an autonomous vehicle is not actively transporting users and/or cargo, and has not yet been assigned to transport users and/or cargo, the remote server can instruct the AV to perform various tasks while it waits for a potential request. For instance, the remote server 136 can reposition the AV to a parking area or designed waiting area in anticipation of a request, instruct the AV to idle at the parking area or designed waiting area, instruct the AV to roam at a particular region or along a particular path, instruct the AV to recharge its batteries at a charging station, instruct the AV to receive maintenance at a service station, and/or perform some other task. This is beneficial, for example, as it prioritizes the transportation of users and/or cargo (e.g., thereby improving the effectiveness and responsiveness of the fleet of AVs), while reducing traffic congestion.

In some embodiments, the remote server 136 prioritizes the transportation of certain users and/or cargo over others. As an example, each request is associated with a particular level of service (e.g., "economy," "standard," "premium," etc.), each having a different priority level. Higher priority requests can take precedence over lower priority requests (e.g., such that they are more likely to be fulfilled first). In some embodiments, higher levels of service are associated with higher fares or rates charged to the user when the level of traffic congestion is higher.

In some implementations, an AV is concurrently assigned to multiple different requests at a time to reduce overall congestion. For instance, an AV can be assigned to pick up a first user (and her travel party) having a first request, pick up a second user (along with her travel party and/or any cargo, if applicable) having a second request, transport both the first user and the second user concurrently, and individually drop each of the users off at their respective destinations (e.g., a "carpooling" arrangement).

In some embodiments, the remote server 136 assigns AVs to reduce overall traffic congestion. For example, if a level of overall traffic congestion is low, the remote server 136 assigns each request a dedicated AV (e.g., such the user and her party do not have to ride with others). However, if the level of overall traffic congestion is high, the remote server can concurrently assign multiple requests to the same AV (e.g., to reduce overall traffic congestion). In some embodiments, each request is associated with a particular level of service (e.g., "economy," "standard," "premium," etc.), each having a different priority level. Higher priority requests can take precedence over lower priority requests, such that they are more likely to be assigned a dedicated autonomous vehicle. In some embodiments, higher levels of service are associated with higher fares or rates charged to the user.

In some embodiments, if overall traffic congestion is high, the remote server 136 offers a user a shared or carpooled ride with one or more other requestors in exchange for a shorter wait time. If the user accepts the offer, the remote server 136 can concurrently assign the user's request and another user's request to the same AV. If the user declines, the remote server 136 can assign the user's request to a dedicated AV when an AV is made available for dedicated use. In some embodiments, the remote server 136 estimates a first length of time associated with fulfilling the user's request using a shared or carpool ride and a second length of time associated with fulfilling the user's request using a dedicated ride, and provide this information to the user (e.g., to assist the user in coming to a decision). As described above (e.g., with respect to FIGS. 14-16), the remote server 136 can estimate a future overall traffic congestion in a particular region, and direct AVs away from that location.

Figure 17:
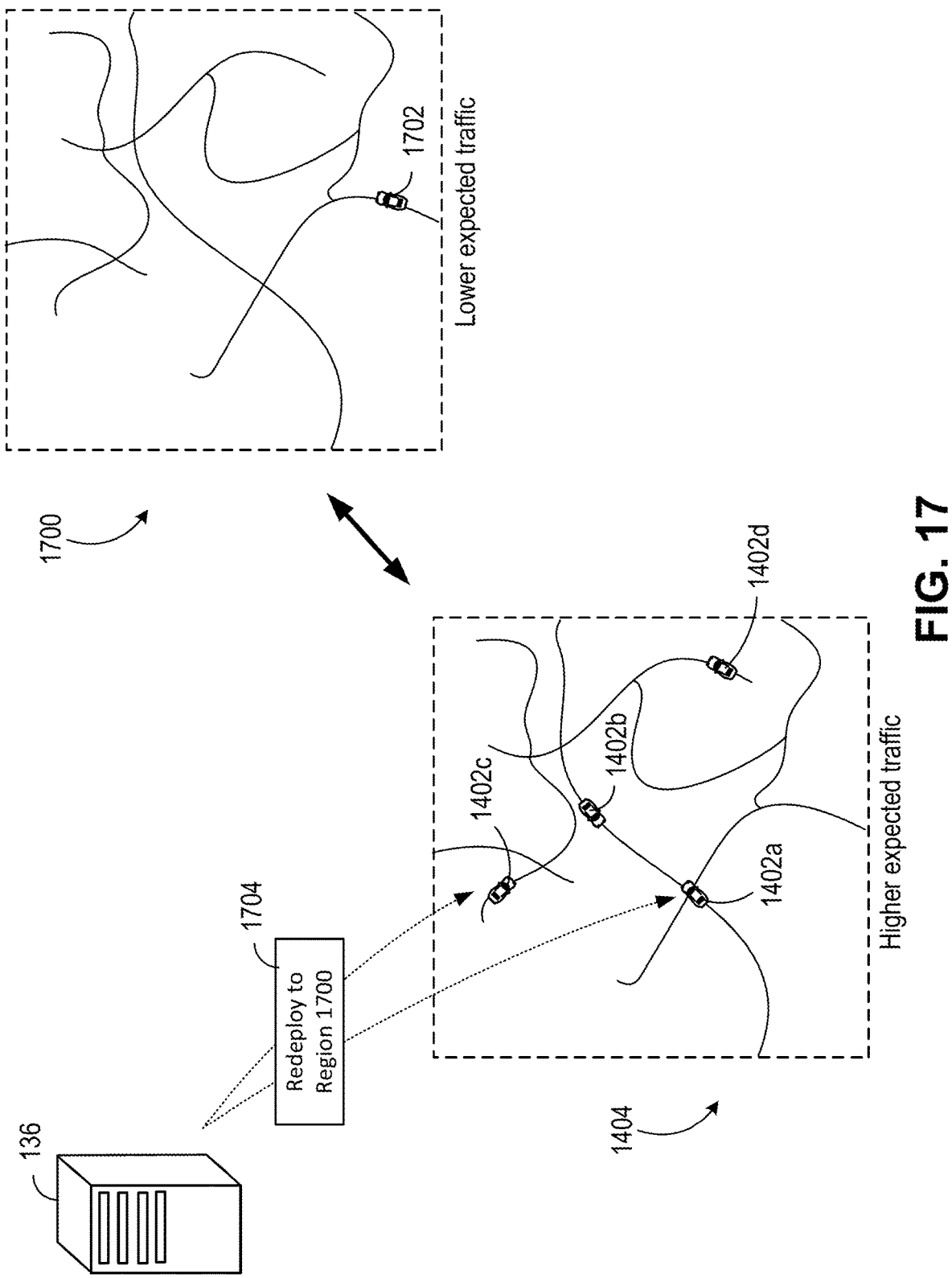

FIG. 17 illustrates an example of autonomous vehicle fleet management, in accordance with one or more embodiments. FIG. 17 shows a first region 1404 having several AVs 1402a-d and a second region 1700 having an AV 1702. The different regions 1404 and 1700 can correspond to different political regions, different pre-defined regions, different transiently-defined region, and/or any other different regions.

In this example, the remote server 136 has estimated that there will be a relatively higher traffic congestion in the first region 1404, and a relatively lower future traffic congestion in the second region 1700 (e.g., based on a statistical model). Further, the remote server 136 can determine that additional AVs are required in the second region 1700 to fulfill an estimated demand in that region, while there are an excess of AVs in the first region 1404 needed to fulfill the estimated demand in that region.

Based on this determination, the remote server 136 transmits instructions 1704 to one or more of the AVs in the region 1404 (e.g., the AVs 1402a and 1402c) instructing them to navigate to the region 1700. In response, the AVs 1402a and 1402c transverse to the region 1700. Upon arrival, the repositioned AVs 1402a and 1402c can be assigned one or more tasks within the region 1700 (e.g., transport users and/or cargo, roam along a particular path, idle at a particular location, charge its batteries at a charging station, receive maintenance at a service station, etc.).

As described above, a user can submit a request specifying a desired pick up location. In response, the remote server 136 transmits information instructing an AV to navigate to that pick up location. However, in some embodiments, the remote server 136 identifies an alternative pick up location and suggest that location to the user to reduce overall traffic congestion (e.g., on a particular street). If the user accepts the alternative pick up location, the remote server 136 can instruct both the user and the AV to meet at the alternative pick up location instead. This can improve the effectiveness and efficiency of the fleet of AVs. For example, a pick up location specified by a user is a location near a high volume of vehicle traffic, a location without a designed pick up area, or a location near a fast flow of traffic. The remote server 136 can determine a nearby alternative location that reduces traffic congestion, and suggest that location for pick up instead.

Figure 18:
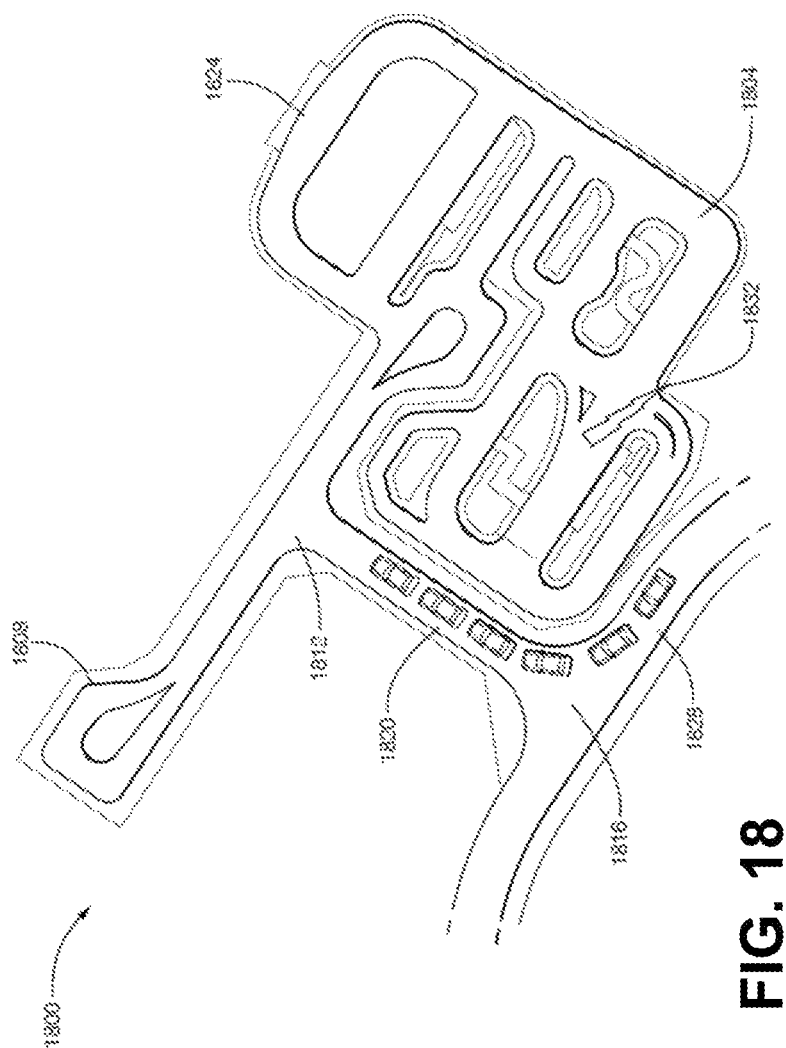

FIG. 18 illustrates an example of autonomous vehicle fleet management, in accordance with one or more embodiments. The map 1800 of FIG. 18 includes an initial location 1804, a destination 1808, a region 1828, a lane segment 1824, a lane segment 1820, an intersection 1812, and an intersection 1816. A large number of vehicles are operating in the region 1828 on the lane segment 1820.

In some embodiments, a remote server (e.g., the remote server 136) receives a request for a vehicular ride from a user device (e.g., the user device 1410). The request includes the initial spatiotemporal location 1804 and the destination spatiotemporal location 1808. The remote server 136 generates a representation of multiple lane segments (e.g., a graph corresponding to the map 1800). Each lane segment in the graph is weighted in accordance with a number of other vehicles on the lane segment. For example, lane segment 1820 has a higher weight than lane segment 1824. The remote server 136 identifies an AV (e.g., AV 100) located within a threshold distance to the initial spatiotemporal location 1804 such that AV 100 has at least one vacant seat. The remote server determines a route for operating the AV 100 from the initial spatiotemporal location 1804 to the destination spatiotemporal location 1808. The route includes lane segments such that an aggregate of weights of the lane segments is below a threshold value. For example, the remote server 136 is more likely to use lane segment 1824 instead of lane segment 1820 to reduce traffic congestion. The remote server 136 transmits the received request and the determined route to the AV 100.

In some embodiments, the AV 100 receives a request for a vehicular ride from the user device 1410. The request includes the initial spatiotemporal location 1804 and the destination spatiotemporal location 1808. The AV 100 transmits the request to the remote server 136. The AV 100 receives a route for operating the AV 100 from the initial spatiotemporal location 1804 to the destination spatiotemporal location 1808 from the remote server 136. The route includes the lane segment 1824. The AV 100 generates a trajectory for operating the AV 100 on the lane segment 1824. The generating includes identifying an object using sensor data received from one or more sensors 1332 of the AV 100 such that a probability of a collision of the AV 100 with the object is greater than a threshold value. The AV 100 generates one or more motion segments along the lane segment 1824 for the AV 100 to avoid the collision.

In some embodiments, the remote server 136 generates a representation (e.g., the graph 1000) of multiple lane segments for operating multiple vehicles. For example, the multiple lane segments includes the lane segments 1820 and 1824. The remote server 136 receives telemetry data from the AV 100 specifying at least one parameter for operating the AV 100. The remote server 136 identifies a corresponding portion of the representation, wherein the portion includes one or more lane segments for operating the AV 100 in accordance with the telemetry data received from the AV 100. For example, the remote server 136 uses the operating design domain parameters of AV 100 to select the lane segment 1824. The remote server 136 receives a request for a vehicular ride, wherein the request specifies the initial spatiotemporal location 1804 and the destination spatiotemporal location 1808. The remote server 136 identifies the AV 100 such that the initial spatiotemporal location 1804 and the destination spatiotemporal location 1808 are both located within the portion of the representation corresponding to the AV 100.

In some embodiments, the remote server 136 transmits to the AV 100 a first route for operating the AV 100. For example, the first route includes the lane segment 1820. The remote server 136 receives a notification that the lane segment 1820 is associated with an event 1832. The remote server 136 transmits to the AV 100 a request for a spatiotemporal location of the AV 100. Responsive to receiving the spatiotemporal location of the AV 100 (say, location 1804), the remote server 136 determines that the AV 100 is located on a lane segment different from the one or more lane segments associated with the event 1832. The remote server 136 generates a second route for operating the AV 100. The second route avoids the one or more lane segments associated with the event 1832. For example, the second route includes the lane segment 1824.

Processes for Operation Using Multiple Motion Constraints

FIG. 19 illustrates a process 1900 for autonomous vehicle fleet management, in accordance with one or more embodiments. In one embodiment, the process of FIG. 19 is performed by the remote server 136. Other entities, for example, one or more components of the AV 100 perform some or all of the steps of the process 1900 in other embodiments. Likewise, embodiments may include different and/or additional steps, or perform the steps in different orders.

The remote server 136 receives 1904 a request (e.g., the request 1408) for a vehicular ride from a user device (e.g., the user device 1410). The request 1408 includes an initial spatiotemporal location (e.g., the location 1804) and a destination spatiotemporal location (e.g., the location 1808).

The remote server 136 generates 1908 a representation (e.g., the graph 1000) of multiple lane segments. Each lane segment in the representation graph 1000 is weighted in accordance with a number of other vehicles on the lane segment. For example, the weight of a lane segment is 1.5 times the number of other vehicles operating on the lane segment.

The remote server 136 identifies 1912 a vehicle (e.g., the AV 100) located within a threshold distance to the initial spatiotemporal location 1804. For example, the threshold distance ranges between 1 mile and 5 miles. The identified AV 100 has at least one vacant seat.

The remote server 136 determines 1916 a route for operating the identified AV 100 from the initial spatiotemporal location 1804 to the destination spatiotemporal location 1808. The route includes one or more lane segments of the multiple lane segments. An aggregate of weights of the one or more lane segments is below a threshold value. For example, the threshold value ranges between 20 and 50.

The remote server 136 transmits 1920 the received request 1408 and the determined route to the AV 100.

FIG. 20 illustrates a process 2000 for autonomous vehicle fleet management, in accordance with one or more embodiments. In one embodiment, the process of FIG. 20 is performed by the AV 100. Other entities, for example, one or more components of the remote server 136 perform some or all of the steps of the process 2000 in other embodiments. Likewise, embodiments may include different and/or additional steps, or perform the steps in different orders.

The AV 100 receives 2004 a request 1408 for a vehicular ride from a user device 1410. The request 1408 includes an initial spatiotemporal location 1804 and a destination spatiotemporal location 1808.

The AV 100 transmits 2008 the request 1408 to the remote server 136.

The AV 100 receives 2012 from the remote server 136 a route for operating the AV 100 from the initial spatiotemporal location 1804 to the destination spatiotemporal location 1808. The route includes one or more lane segments.

The AV 100 generates 2016 a trajectory for operating the AV 100 on a lane segment of the one or more lane segments. The generating 2016 includes identifying 2020 an object using sensor data received from one or more sensors 1332 of the AV 100 such that a probability of a collision of the AV 100 with the object is greater than a threshold value. For example, the probability of a collision of the AV 100 with the object ranges between 0% and 100%, and the threshold value ranges between 1% and 5%.

The AV 100 generates 2024 one or more motion segments for the AV 100 to avoid the collision.

FIG. 21 illustrates a process 2100 for autonomous vehicle fleet management, in accordance with one or more embodiments. In one embodiment, the process of FIG. 21 is performed by the remote server 136. Other entities, for example, one or more components of the AV 100 perform some or all of the steps of the process 2100 in other embodiments. Likewise, embodiments may include different and/or additional steps, or perform the steps in different orders.

The remote server 136 generates 2104 a representation (e.g., the graph 1000) of multiple lane segments for operating multiple vehicles.

The remote server 136 receives 2108, from each vehicle of the multiple vehicles, telemetry data specifying at least one parameter for operating the vehicle.

The remote server 136 identifies 2112 a corresponding portion of the representation graph 1000 for each vehicle of the multiple vehicles. The portion includes one or more lane segments of the multiple lane segments for operating the vehicle in accordance with the telemetry data received from the vehicle.

The remote server 136 receives 2116 a request 1408 for a vehicular ride from a user device 1410. The request 1408 specifies an initial spatiotemporal location 1804 and a destination spatiotemporal location 1808.

The remote server 136 identifies 2120 a vehicle (e.g., the AV 100) of the multiple vehicles, such that the initial spatiotemporal location 1804 and the destination spatiotemporal location 1808 are both located within the portion of the representation graph 1000 corresponding to the identified vehicle, AV 100.

FIG. 22 illustrates a process 2200 for autonomous vehicle fleet management, in accordance with one or more embodiments. In one embodiment, the process of FIG. 22 is performed by the remote server 136. Other entities, for example, one or more components of the AV 100 perform some or all of the steps of the process 2200 in other embodiments. Likewise, embodiments may include different and/or additional steps, or perform the steps in different orders.

The remote server 136 transmits 2204 a first route for operating the AV 100 to the AV 100. The first route includes multiple lane segments.

The remote server 136 receives 2208 a notification that one or more lane segments of the multiple lane segments is associated with an event (e.g., the event 1832).

The remote server 136 transmits 2212 a request for a spatiotemporal location of the AV to the AV 100.

Responsive to receiving the spatiotemporal location of the AV 100 from the AV 100, the remote server 136 determines 2216 that the AV 100 is located on a lane segment different from the one or more lane segments associated with the event 1832.

Responsive to the determining that the AV 100 is located on the lane segment different from the one or more lane segments, the remote server 136 generates 2220 a second route for operating the AV 100. The second route avoids the one or more lane segments associated with the event 1832.

Additional Embodiments

In an embodiment, a request for a vehicular ride is received from a user device. The request includes an initial spatiotemporal location and a destination spatiotemporal location. One or more processors generate a representation of multiple lane segments. Each lane segment in the representation is weighted in accordance with a number of other vehicles on the lane segment. The one or more processors identify a vehicle located within a threshold distance to the initial spatiotemporal location. The identified vehicle includes at least one vacant seat. The one or more processors determine a route for operating the identified vehicle from the initial spatiotemporal location to the destination spatiotemporal location. The route includes one or more lane segments of the multiple lane segments. An aggregate of weights of the one or more lane segments is below a threshold value. The received request and the determined route is transmitted to the identified vehicle.

In an embodiment, the generating of the rerouting information for the identified third-party vehicle is performed using the level of risk associated with operating a vehicle on each lane segment of the multiple lane segments of the environment.

In an embodiment, the one or more processors receive telemetry data from the vehicle located within the threshold distance to the initial spatiotemporal location.

In an embodiment, the telemetry data includes a spatiotemporal location of the vehicle located within the threshold distance to the initial spatiotemporal location.

In an embodiment, the identifying of the vehicle located within the threshold distance to the initial spatiotemporal location is performed based on the telemetry data.

In an embodiment, one or more processors of a vehicle receive a request for a vehicular ride from a user device. The request includes an initial spatiotemporal location and a destination spatiotemporal location. The request is transmitted to a remote server. From the remote server, a route is received for operating the vehicle from the initial spatiotemporal location to the destination spatiotemporal location. The route includes one or more lane segments. The one or more processors generate a trajectory for operating the vehicle on a lane segment of the one or more lane segments. The generating includes identifying an object using sensor data received from one or more sensors of the vehicle. A probability of a collision of the vehicle with the object is greater than a threshold value. The one or more processors generate one or more motion segments for the vehicle to avoid the collision.

In an embodiment, the trajectory is generated such that a level of passenger comfort measured, using one or more passenger sensors of the vehicle, is above a threshold value.

In an embodiment, telemetry data indicating that the vehicle is operating in a busy mode of operation is transmitted to the remote server.

In an embodiment, the vehicle operates in an available mode of operation when a number of passengers riding within the vehicle is less than a seating capacity of the vehicle.

In an embodiment, each lane segment of the one or more lane segments is weighted by a number of vehicles operating on the lane segment. An aggregate of weights of the one or more lane segments is below a threshold value.

In an embodiment, one or more objects located within a threshold distance to the vehicle are identified using the sensor data.

In an embodiment, telemetry data indicating the one or more objects for updating the weights of the one or more lane segments is transmitted to the remote server.

In an embodiment, the sensor data includes information received wirelessly from traffic signals located on the one or more lane segments. The information represents a level of traffic congestion on the one or more lane segments.

In an embodiment, telemetry data indicating a level of charge of a battery of the vehicle is transmitted to the remote server.

In an embodiment, the route received from the remote server includes instructions to the vehicle to navigate to a spatiotemporal location associated with an electrical charging station.

In an embodiment, the telemetry data includes one or more data items in a JavaScript Object Notation (JSON) format.

In an embodiment, telemetry data indicating an abnormal operation of the vehicle is transmitted to the remote server.

In an embodiment, the abnormal operation of the vehicle is an interruption of a network connection between the vehicle and the remote server.

In an embodiment, the telemetry data indicates that the trajectory of the vehicle is obstructed.

In an embodiment, the telemetry data indicates an occurrence of an event with respect to the vehicle.

In an embodiment, the event is traffic congestion in a region in which the vehicle is operating.

In an embodiment, the event is road construction in a region in which the vehicle is operating.

In an embodiment, the event is a decrease in speed of a traffic pattern along the route of the vehicle.

In an embodiment, one or more processors generate a representation of multiple lane segments for operating multiple vehicles. From each vehicle of the multiple vehicles, telemetry data is received specifying at least one parameter for operating the vehicle. For each vehicle of the multiple vehicles, a corresponding portion of the representation is identified. The portion includes one or more lane segments of the multiple lane segments for operating the vehicle in accordance with the telemetry data received from the vehicle. From a user device, a request for a vehicular ride is received. The request specifies an initial spatiotemporal location and a destination spatiotemporal location. The one or more processors identify a vehicle of the multiple vehicles, such that the initial spatiotemporal location and the destination spatiotemporal location are both located within the portion of the representation corresponding to the identified vehicle.

In an embodiment, the representation of the multiple lane segments for operating the multiple vehicles is at least one of a weighted graph, a linked list, or a multi-dimensional array.

In an embodiment, a route for operating the vehicle is generated for the identified vehicle. The route includes a subset of the one or more lane segments of the corresponding portion of the representation.

In an embodiment, the telemetry data includes a spatiotemporal location that must be included within the generated route. The generated route further includes the spatiotemporal location.

In an embodiment, the request is received from the user device at a first time. The request for the vehicular ride further specifies a start time later than the first time.

In an embodiment, the one or more processors determine, at the first time, that an operating state of the identified vehicle is busy.

In an embodiment, the one or more processors determine that the operating state of the identified vehicle at the specified start time will be available.

In an embodiment, the generated route for operating the vehicle at the specified start time in accordance with the parameter vector received from the vehicle is transmitted to the identified vehicle.

In an embodiment, the one or more processors determine that a level of traffic congestion on the generated route is higher than a threshold value using the portion of the representation corresponding to the identified vehicle.

In an embodiment, an updated route including a second subset of the one or more lane segments of the corresponding portion of the environment is generated for the identified vehicle. A level of traffic congestion on the updated route is less than the threshold value.

In an embodiment, the parameter includes a maximum speed limit.

In an embodiment, the parameter includes one or more operating times.

In an embodiment, the parameter includes one or more operating weather conditions.

In an embodiment, the parameter includes one or more roadways.

In an embodiment, the parameter includes one or more regions denoted by geofences.

In an embodiment, the telemetry data further includes at least one of a video or an image captured by a sensor of the vehicle.

In an embodiment, the telemetry data further includes an indication of a classification of an object located on the one or more lane segments of the multiple lane segments.

In an embodiment, the telemetry data further includes textual data indicating the location of the object relative to the vehicle.

In an embodiment, the textual data further includes one or more data items in a JavaScript Object Notation (JSON) format.

In an embodiment, a first route for operating a vehicle is transmitted to the vehicle. The first route includes multiple lane segments. One or more processors receive a notification that one or more lane segments of the multiple lane segments is associated with an event. A request for a spatiotemporal location of the vehicle is transmitted to the vehicle. Responsive to receiving the spatiotemporal location of the vehicle from the vehicle, the one or more processors determine that the vehicle is located on a lane segment different from the one or more lane segments associated with the event. Responsive to the determining that the vehicle is located on the lane segment different from the one or more lane segments, a second route is generated for operating the vehicle. The second route avoids the one or more lane segments associated with the event.

In an embodiment, information representing the second route and instructing the vehicle to abandon the first route is transmitted to the vehicle.

In an embodiment, a request for routing information is received from a third-party server. The request references the one or more lane segments associated with the event.

In an embodiment, the information representing the second route is transmitted to the third-party server.

In an embodiment, the one or more processors determine that a battery level of the vehicle is less than a threshold value.

In an embodiment, responsive to determining that the vehicle completed the second route, the vehicle is directed to a charging station.

In an embodiment, the one or more processors determine that a maintenance time of the vehicle has been exceeded.

In an embodiment, responsive to determining that the vehicle completed the second route, the vehicle is directed to a maintenance facility.

In an embodiment, the one or more processors determine a model of the vehicle. A level of resolution of the first route transmitted to the vehicle is based on the model of the vehicle.

In an embodiment, one or more processors of the vehicle determine that a network connection is dropped.

In an embodiment, a control module of the vehicle navigates the vehicle in accordance with a stored copy of the second route.

In an embodiment, one or more passenger sensors of the vehicle determine that a passenger is riding in the vehicle. The one or more processors generate a graphical user interface including a representation of the second route to alert the passenger of the event and the second route.

In an embodiment, a smart speaker of the vehicle receives a voice command from the passenger. The voice command is directed to the graphical user interface.

In an embodiment, the one or more processors generate audio output describing the event and the second route.

In an embodiment, a graph describing the operating constraint is added to the graphical user interface.

In an embodiment, the graphical user interface further includes a computer-executable semantic icon.

In an embodiment, the computer-executable semantic icon is used to receive passenger input directed to the second route.

In an embodiment, responsive to receiving the passenger input, text representing the second route is displayed on a display device of the vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
receiving, by one or more processors, from a user device, a request for a vehicular ride, wherein the request comprises an initial spatiotemporal location and a destination spatiotemporal location;
generating, using the one or more processors, a representation of a plurality of lane segments;
determining, using the one or more processors, for each lane segment in the representation, a number of other vehicles on that lane segment;
weighting, using the one or more processors, each lane segment in the representation in accordance with the number of other vehicles on that lane segment;
identifying, using the one or more processors, a vehicle located within a threshold distance to the initial spatiotemporal location, such that the identified vehicle comprises at least one vacant seat;
determining, using the one or more processors, a route for operating the identified vehicle from the initial spatiotemporal location to the destination spatiotemporal location, wherein the route comprises one or more lane segments of the plurality of lane segments, and wherein determining the route comprises:
determining an aggregate of weights of the one or more lane segments, and
determining that the aggregate of the weights of the one or more lane segments is below a threshold value, and
responsive to determining that the aggregate of the weights of the one or more lane segments is below the threshold value, including the one or more lane segments in the route; and
transmitting, to the identified vehicle, the received request and the determined route.

2. The method of claim 1, wherein the representation comprises a plurality of intersections, such that each lane segment of the plurality of lane segments connects two different intersections of the plurality of intersections.

3. The method of claim 1, further comprising receiving, from each other vehicle of the other vehicles operating on the plurality of lane segments, a spatiotemporal location of the each other vehicle.

4. The method of claim 3, further comprising updating, using the received spatiotemporal location of each other vehicle of the other vehicles, the weights of the one or more lane segments.

5. The method of claim 1, further comprising transmitting, to the user device, an identity of the identified vehicle and the determined route.

6. The method of claim 1, wherein the identifying of the vehicle is performed based on a parameter representing a type of weather.

7. The method of claim 1, wherein the identifying of the vehicle is performed based on a parameter representing a maximum operating speed of the vehicle.

8. The method of claim 1, wherein the identifying of the vehicle is performed based on a parameter representing a maximum seating capacity of the vehicle.

9. The method of claim 1, wherein the identifying of the vehicle is performed based on a parameter representing a grade of service specified by the user device.

10. The method of claim 1, wherein the determining of the route is performed based on a type of lane segment specified by the user device.

11. The method of claim 1, wherein the determining of the route is performed based on an operational constraint of the vehicle.

12. The method of claim 1, wherein the representation further comprises a plurality of regions and, for each region of the plurality of regions, a level of traffic congestion of the region.

13. The method of claim 12, further comprising receiving, from a third-party server, for each third-party vehicle of a plurality of third-party vehicles, a spatiotemporal location of the third-party vehicle.

14. The method of claim 13, further comprising updating, using the received spatiotemporal locations of the plurality of third-party vehicles, the level of traffic congestion of each region.

15. The method of claim 14, further comprising identifying, using the updated level of traffic congestion for each region, a third-party vehicle of the plurality of third-party vehicles, such that the identified third-party vehicle is operating within a region that has a level of traffic congestion above a threshold value.

16. The method of claim 15, further comprising generating, using the updated level of traffic congestion for each region, rerouting information for the identified third-party vehicle, such that the rerouting information specifies one or more additional lane segments located outside the region that has the level of traffic congestion above the threshold value.

17. The method of claim 16, further comprising transmitting, to the third-party server, the rerouting information for the identified third-party vehicle.

18. The method of claim 1, wherein the generated representation further comprises, for each lane segment of a plurality of lane segments, a level of risk associated with operating a vehicle on the lane segment.

19. The method of claim 1, wherein the threshold value is determined based on a time of day.

20. A computer system comprising:
one or more computer processors; and
one or more non-transitory storage media storing instructions which, when executed by the one or more computer processors, cause the one or more computer processors to:
receive, from a user device, a request for a vehicular ride, wherein the request comprises an initial spatiotemporal location and a destination spatiotemporal location;
generate a representation of a plurality of lane segments;
determine, for each lane segment in the representation, a number of other vehicles on that lane segment;
weight each lane segment in the representation in accordance with the number of other vehicles on that lane segment;
identify a vehicle located within a threshold distance to the initial spatiotemporal location, such that the identified vehicle comprises at least one vacant seat;

determine a route for operating the identified vehicle from the initial spatiotemporal location to the destination spatiotemporal location, wherein the route comprises one or more lane segments of the plurality of lane segments, and wherein determining the route comprises:
- determining an aggregate of weights of the one or more lane segments, and
- determining that the aggregate of the weights of the one or more lane segments is below a threshold value, and
- responsive to determining that the aggregate of the weights of the one or more lane segments is below the threshold value, including the one or more lane segments in the route; and transmit, to the identified vehicle, the received request and the determined route.

21. One or more non-transitory storage media storing instructions which, when executed by one or more computing devices, cause the one or more computing devices to:
- receive, from a user device, a request for a vehicular ride, wherein the request comprises an initial spatiotemporal location and a destination spatiotemporal location;
- generate a representation of a plurality of lane segments
- determine, for each lane segment in the representation, a number of other vehicles on that lane segment weight each lane segment in the representation in accordance with the number of other vehicles on that lane segment;
- identify a vehicle located within a threshold distance to the initial spatiotemporal location, such that the identified vehicle comprises at least one vacant seat;
- determine a route for operating the identified vehicle from the initial spatiotemporal location to the destination spatiotemporal location, wherein the route comprises one or more lane segments of the plurality of lane segments, and wherein determining the route comprises:
  - determining an aggregate of weights of the one or more lane segments, and
  - determining that the aggregate of the weights of the one or more lane segments is below a threshold value, and
  - responsive to determining that the aggregate of the weights of the one or more lane segments is below the threshold value, including the one or more lane segments in the route; and
- transmit, to the identified vehicle, the received request and the determined route.

* * * * *